(12) United States Patent
Thomas et al.

(10) Patent No.: US 11,303,599 B2
(45) Date of Patent: Apr. 12, 2022

(54) NETWORK-BASED MESSAGING SYSTEM WITH DATABASE MANAGEMENT FOR COMPUTER BASED INTER-USER COMMUNICATION

(71) Applicants: C. Douglass Thomas, Saratoga, CA (US); Albert S. Penilla, Los Altos, CA (US)

(72) Inventors: C. Douglass Thomas, Saratoga, CA (US); Albert S. Penilla, Los Altos, CA (US)

( * ) Notice: Subject to any disclaimer, the term of this patent is extended or adjusted under 35 U.S.C. 154(b) by 411 days.

(21) Appl. No.: 14/985,124

(22) Filed: Dec. 30, 2015

(65) Prior Publication Data

US 2016/0191453 A1 Jun. 30, 2016

Related U.S. Application Data

(60) Provisional application No. 62/115,309, filed on Feb. 12, 2015, provisional application No. 62/099,105, filed on Dec. 31, 2014.

(51) Int. Cl.
| | |
|---|---|
| *H04L 12/58* | (2006.01) |
| *H04W 4/12* | (2009.01) |
| *H04L 51/42* | (2022.01) |
| *H04L 51/00* | (2022.01) |
| *H04L 51/224* | (2022.01) |
| *H04L 51/226* | (2022.01) |
| *H04L 51/52* | (2022.01) |
| *H04L 51/56* | (2022.01) |
| *H04L 51/58* | (2022.01) |

(52) U.S. Cl.
CPC ............. *H04L 51/22* (2013.01); *H04L 51/14* (2013.01); *H04L 51/24* (2013.01); *H04L 51/26* (2013.01); *H04L 51/32* (2013.01); *H04L 51/36* (2013.01); *H04L 51/38* (2013.01); *H04W 4/12* (2013.01)

(58) Field of Classification Search
CPC ...... G06Q 10/107; G06Q 10/10; H04L 51/00; H04L 51/04; H04L 51/10; H04L 51/12; H04L 51/18
USPC .................................................. 709/204–207
See application file for complete search history.

(56) References Cited

U.S. PATENT DOCUMENTS

| | | | |
|---|---|---|---|
| 5,708,660 A | | 1/1998 | Riedel |
| 6,052,709 A | * | 4/2000 | Paul ..................... G06Q 10/107 709/202 |

(Continued)

OTHER PUBLICATIONS

The American Heritage Dictionary of the English Language 337, 493, 1870 (3rd ed. 1992) (Year: 1992).*

(Continued)

*Primary Examiner* — David P Zarka

(57) ABSTRACT

Methods and systems for network-based messaging systems with database management for supporting based inter-user communications, such as via computing devices, are disclosed. The methods and systems facilitate improved message transmission management for more efficient communications. The methods and systems can provide enhanced electronic communications, such as via electronic mail or text messaging. Improved communication tools are provided to better manage and/or control communications. The computing devices can be personal communication/computing devices, such as mobile, portable or handheld computing devices (e.g., smart phone, a laptop, a tablet, etc.).

14 Claims, 26 Drawing Sheets

(56) References Cited

U.S. PATENT DOCUMENTS

| | | | |
|---|---|---|---|
| 7,552,177 B2* | 6/2009 | Kessen | H04L 51/04 709/204 |
| 7,603,417 B2* | 10/2009 | Ben-Yoseph | H04L 51/043 709/206 |
| 7,617,285 B1* | 11/2009 | Hartmann | G06Q 10/107 709/206 |
| 7,739,344 B2* | 6/2010 | Hui | G06Q 10/109 709/206 |
| 7,774,407 B2* | 8/2010 | Daly | H04L 51/04 709/204 |
| 7,869,794 B1 | 1/2011 | Weaver | |
| 8,296,380 B1 | 10/2012 | Kelly | |
| 8,359,289 B1 | 1/2013 | Low | |
| 8,385,884 B1* | 2/2013 | Hertzfeld | H04M 1/72451 455/411 |
| 8,443,049 B1* | 5/2013 | Geddes | H04L 63/126 709/205 |
| 8,577,972 B1* | 11/2013 | Heikes | H04L 51/04 709/206 |
| 8,775,950 B2* | 7/2014 | Valeski | G06F 3/0481 715/758 |
| 8,972,495 B1 | 3/2015 | Borna | |
| 9,124,645 B2* | 9/2015 | Colon | H04L 51/04 |
| 9,209,993 B2* | 12/2015 | Woley | H04L 51/12 |
| 9,626,681 B2 | 4/2017 | Muller | |
| 10,142,274 B2 | 11/2018 | Penilla et al. | |
| 10,291,566 B2 | 5/2019 | Penilla et al. | |
| 2003/0033467 A1 | 2/2003 | Yoshizawa | |
| 2003/0046421 A1 | 3/2003 | Horvitz | |
| 2003/0206619 A1* | 11/2003 | Curbow | H04M 3/42195 379/210.01 |
| 2004/0030753 A1 | 2/2004 | Horvitz | |
| 2004/0098423 A1 | 5/2004 | Chigusa | |
| 2004/0199592 A1 | 10/2004 | Gould | |
| 2004/0254998 A1 | 12/2004 | Horvitz | |
| 2005/0021832 A1 | 1/2005 | Bennett | |
| 2005/0055410 A1 | 3/2005 | Landsman | |
| 2005/0055416 A1* | 3/2005 | Heikes | H04L 51/04 709/207 |
| 2005/0198173 A1* | 9/2005 | Evans | H04L 51/12 709/206 |
| 2005/0227678 A1* | 10/2005 | Agrawal | H04L 51/12 455/414.3 |
| 2006/0019639 A1 | 1/2006 | Adams | |
| 2006/0085528 A1* | 4/2006 | Thomas | G06F 21/564 709/223 |
| 2006/0112166 A1 | 5/2006 | Pettigrew | |
| 2006/0168017 A1* | 7/2006 | Stern | G06Q 10/107 709/206 |
| 2007/0004385 A1 | 1/2007 | Horvitz | |
| 2007/0064899 A1 | 3/2007 | Boss | |
| 2008/0043941 A1 | 2/2008 | Tang | |
| 2008/0046532 A1* | 2/2008 | Caspi | G06Q 10/107 709/207 |
| 2008/0120704 A1 | 5/2008 | Sutton | |
| 2008/0175174 A1* | 7/2008 | Altberg | G06Q 30/02 370/259 |
| 2009/0037539 A1 | 2/2009 | Postmus | |
| 2009/0055489 A1 | 2/2009 | Agarwal | |
| 2009/0055491 A1 | 2/2009 | Agarwal | |
| 2009/0070210 A1* | 3/2009 | White | G06Q 30/0277 705/14.73 |
| 2009/0105377 A1 | 4/2009 | McQuillen | |
| 2009/0106365 A1 | 4/2009 | Drory | |
| 2009/0299934 A1 | 12/2009 | Horvitz | |
| 2010/0088180 A1* | 4/2010 | Ventilla | G06Q 30/00 705/14.53 |
| 2010/0165980 A1* | 7/2010 | Sargor | H04L 12/2889 370/352 |
| 2010/0185741 A1 | 7/2010 | Lee | |
| 2010/0228582 A1 | 9/2010 | King | |
| 2010/0228830 A1 | 9/2010 | Uchida | |
| 2011/0246584 A1 | 10/2011 | Vitaldevara | |
| 2012/0030293 A1* | 2/2012 | Bobotek | G06Q 10/10 709/206 |
| 2012/0117161 A1 | 5/2012 | Best | |
| 2012/0143972 A1 | 6/2012 | Malik | |
| 2012/0159514 A1 | 6/2012 | Sigalov | |
| 2012/0173642 A1* | 7/2012 | Rosenberger | G06F 16/48 709/206 |
| 2012/0315932 A1* | 12/2012 | Spann | G06Q 10/10 455/466 |
| 2012/0324568 A1* | 12/2012 | Wyatt | G06F 21/51 726/13 |
| 2013/0080543 A1 | 3/2013 | Jang | |
| 2013/0097248 A1 | 4/2013 | Chakra | |
| 2013/0173727 A1* | 7/2013 | Libin | H04L 51/10 709/206 |
| 2013/0194301 A1 | 8/2013 | Robbins | |
| 2013/0218986 A1 | 8/2013 | Sobhani | |
| 2014/0032682 A1 | 1/2014 | Prado | |
| 2014/0086235 A1* | 3/2014 | Reynolds | H04L 67/306 370/352 |
| 2014/0089416 A1* | 3/2014 | Wang | H04L 51/04 709/205 |
| 2014/0095631 A1 | 4/2014 | Ravi | |
| 2014/0173755 A1 | 6/2014 | Wahl | |
| 2014/0194151 A1* | 7/2014 | Bengtsson | H04L 51/36 455/466 |
| 2014/0235204 A1* | 8/2014 | Nieves | H04W 12/08 455/410 |
| 2014/0280534 A1 | 9/2014 | Bell | |
| 2015/0207769 A1 | 7/2015 | Lu | |
| 2015/0326510 A1 | 11/2015 | Tomlinson | |
| 2016/0164816 A1 | 6/2016 | Bhagwan | |
| 2016/0165040 A1* | 6/2016 | Queru | B60K 35/00 455/418 |
| 2016/0191437 A1 | 6/2016 | Thomas | |
| 2016/0191444 A1 | 6/2016 | Penilla et al. | |
| 2016/0191453 A1 | 6/2016 | Thomas | |
| 2017/0134322 A1 | 5/2017 | McQuillen | |

OTHER PUBLICATIONS

Office Action for U.S. Appl. No. 14/985,292, dated Jan. 26, 2018.
Office Action for U.S. Appl. No. 14/985,295, dated Sep. 19, 2017.
Final Office Action for U.S. Appl. No. 14/985,295, dated Apr. 3, 2018.
Office Action for U.S. Appl. No. 14/985,124, dated Oct. 6, 2017.
Restriction Requirement for U.S. Appl. No. 15/041,089, dated Oct. 23, 2017.
Office Action for U.S. Appl. No. 15/041,089, dated Dec. 5, 2017.
Final Office Action for U.S. Appl. No. 14/985,295, dated Jul. 27, 2018.
Advisory Action for U.S. Appl. No. 14/985,295, dated Aug. 2, 2018.
Office Action for U.S. Appl. No. 16/201,998, dated Sep. 9, 2019.
Final Office Action for U.S. Appl. No. 14/985,124, dated Sep. 11, 2019.
Notice of Allowance for U.S. Appl. No. 14/895,292, dated Sep. 11, 2019.
Notice of Allowance or U.S. Appl. No. 14/985,292, dated Jan. 2, 2018.
Final Office Action for U.S. Appl. No. 14/985,124, dated May 18, 2020.

* cited by examiner

Assigning Action Throttles to Voicemail Recipients

VOICEMAIL

| | |
|---|---|
| Voicemail<br>Mom (415) 666-1212<br>msg... | Oct. 1, 2014<br>7:12 am<br>Active: Action Throttle |

→ Action Throttle Previously assigned

| | |
|---|---|
| Voicemail<br>John Smith (444) 555-1212<br>Bob, please call me back,<br>this is John | Oct. 1, 2014<br>9:05 am<br>Add: Action Throttle |

| | |
|---|---|
| Voicemail<br>John Smith (444) 555-1212<br>Bob, it's John again, I have<br>details on the purchase, I will<br>be home, so call me | Oct. 1, 2014<br>9:10 am |

→ Action Throttle (Recommended) Caller has called more than X times within Y time frame

| | |
|---|---|
| Voicemail<br>John Smith (444) 555-1212<br>Call me -- it's John. | Oct. 3, 2014<br>10:00 am |

| | |
|---|---|
| Voicemail<br>Wife (222) 232-1212<br>msg... | Oct. 3, 2014<br>10:12 am<br>Active: Action Throttle |

→ Action Throttle Previously assigned

| | |
|---|---|
| Voicemail<br>John Smith (444) 555-1212<br>Bob, I really need to talk,<br>Call me. | Oct. 3, 2014<br>1:10 pm |

| | |
|---|---|
| Voicemail<br>James Taylor (650) 111-1212<br>msg... | Oct. 4, 2014<br>5:00 pm |

| | |
|---|---|
| Voicemail<br>Chris Jones (777) 151-1212<br>msg... | Oct. 4, 2014<br>6:15 pm |

| | |
|---|---|
| Voicemail<br>My Boss (888) 122-5555<br>msg... | Oct. 4, 2014<br>9:00 pm<br>Active: Action Throttle |

→ Action Throttle Previously assigned

FIG. 11B

Sender Table 1500

| Sender | Throttle | *Summary* |
|--------|----------|-----------|
| A1 | Enable | *Enable* |

FIG. 15A

Throttle Table 1502

| Sender | Threshold | *Count* |
|--------|-----------|---------|
| A1 | 5 | *7* |

FIG. 15B

Summary Table 1504

| Sender | Threshold | *Count* |
|--------|-----------|---------|
| A1 | 5 | *S101* |

FIG. 15C

Message Table  1506

| Sender | ID | Time | Read | Summary Message Set | Message Content |
|---|---|---|---|---|---|
| A1 | M1 | 10:00 1/1/15 | N | n/a | Hi, where are you? |
| A1 | M2 | 10:01 1/1/15 | N | n/a | Home now? |
| A1 | M3 | 10:02 1/1/15 | N | n/a | Hello |
| ... | ... | ... | ... | ... | ... |
| A1 | M6 | 10:06 1/1/15 | N | n/a | WTF? |
| A1 | S101 | 10:10 1/1/15 | N | M1-M6 | Hi, where are you? Answer ASAP? |
| ... | ... | ... | ... | ... | ... |
|  |  |  |  |  |  |

FIG. 15D

NETWORK-BASED MESSAGING SYSTEM WITH DATABASE MANAGEMENT FOR COMPUTER BASED INTER-USER COMMUNICATION

CROSS-REFERENCE TO RELATED APPLICATIONS

This application claims priority benefit of U.S. Provisional Patent Application No. 62/099,105, entitled "COMPUTER BASED USER COMMUNICATION," and filed on Dec. 31, 2014, and which is hereby incorporated herein by reference.

This application also claims priority benefit of U.S. Provisional Patent Application No. 62/115,309, entitled "MESSAGE COMMUNICATION SYSTEMS AND APPLICATIONS WITH MESSAGE LIFETIME SETTINGS FOR AUTOMATIC MESSAGE DELETION," and filed on Feb. 12, 2015, and which is hereby incorporated herein by reference.

BACKGROUND

Today, it is popular for people to text message or chat amongst one another. Text messages can be sent by various means, such as Short Message Service (SMS) or dedicated application programs (e.g., instant messaging applications). Examples of dedicated application programs include Whatsapp, Snapchat, Google Talk, ChatOn, and Facebook Messenger. Also, it is popular for people to also communicate by electronic mail (email), phone or video calls, using mobile telephones or computers. Mobile telephones enable communication by electronic mail, text messages or voice calls. One example of a VoIP-based phone application is Skype.

As communication options keep expanding, users will necessarily be required to manage multiple accounts for receiving communications. In some cases, users are forced to manage multiple accounts to keep personal and business communications separate. Although expanding the communications options for users is a benefit in terms of expanding the user's communication reach, users are currently challenged to keep up with the volume and intensity of received messages. This challenge is in part due to the vast amounts of social and work related demands on a user's time.

There remains a need for improved approaches to enable users to more efficiently manage communications, such as responses to communication requests, between one or more communication modes.

SUMMARY

The invention pertains to methods and systems for network-based messaging systems with database management for supporting based inter-user communications, such as via computing devices. The methods and systems facilitate improved message transmission management for more efficient communications. The methods and systems can provide enhanced electronic communications, such as via electronic mail or text messaging. Improved communication tools are provided to better manage and/or control communications. The computing devices can be personal communication/computing devices, such as mobile, portable or handheld computing devices (e.g., smart phone, a laptop, a tablet, etc.).

The invention may be implemented in numerous ways, including, but not limited to, as a method, system, device, or apparatus (including computer program code). Several embodiments of the invention are discussed below.

As a cloud system for servicing message exchanges between users that operate as senders and recipients of messages, one embodiment of the cloud system can, for example, include a server interfaced with storage, and a database operatively accessible by the server. The storage can be used to store messages being exchanged by the users. The users can be provided with access to the cloud system via user accounts managed by the cloud system. The user accounts can enable the users to send and receive messages. The server can operate to receive messages from one or more senders and to cause messages to be sent to one or more recipients. The server can include throttle logic that enables users to configure and apply throttle settings on the one or more senders that send messages. A throttle setting is a configuration that limits messages that will be presented to the recipient from the sender. Also, configuration of throttle settings can act to provide an automatic notification to a sender informing the sender that messages sent to the recipient have been delayed due to throttling of the messages. The database can be configured to store message management data for users, and the message management data can include the throttle settings.

As a computer-implemented method for processing text messages exchanged between senders and recipients, one embodiment can be executed by one or more servers of a messaging service that is accessible to users that are users having user accounts with the messaging service. In one embodiment, the computer-implemented method can, for example, include at least: processing text messages by a user that acts as a sender to a user that acts as a recipient; receiving a throttle setting from the recipient, the throttle setting being a configuration that identifies the sender, the configuration identifying a threshold number of text messages that will be sequentially received from the sender to the recipient before a throttle action is applied to the text messages received from the sender for the recipient; detecting that the threshold number of text messages sent from the sender to the recipient has been exceeded; and stopping additional text messages sent by the sender to the recipient from being presented to the recipient after the threshold number of text messages has been detected to have been sent by the sender to the recipient.

In one embodiment, the computer-implemented method can also include sending a notification to the sender informing the sender that the additional text messages to the recipient have been stopped due to exceeding the threshold number of text messages.

In one embodiment, the computer-implemented method can also include providing a visual indicator on a display of a computing device associated with the sender, the visual indicator indicating those one or more messages from the sender that have been stopped from been presented to the recipient.

In one embodiment, the computer-implemented method can also enable users to access the messaging service via an application accessible by user devices. The application can, for example, include user interfaces for composing text messages, reading text messages, controls for sending text messages, controls for applying the throttle setting, controls for selecting recipients of text messages, and/or controls for viewing a history of messages between one or more senders and recipients.

In one embodiment, the computer-implemented method can also utilize or interact with a server-side application to connected with a client-side application of the messaging service. The client-side application can be a downloadable application that is provided by the messaging service for devices to user the client-side application. The client-side application can include a user interface for applying a throttle setting.

In one embodiment, the computer-implemented method can also utilize or access a database that stores message management information regarding at least throttle settings assigned to users acting as senders to particular recipients.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 11A-11B illustrate an example of a sender processing module receiving data or pulling data from various sources so that throttling can be applied.

FIGS. 15A-15D are exemplary database tables provided in a database that supports throttling of messages and/or providing summary messages.

DETAILED DESCRIPTION OF EMBODIMENTS OF THE INVENTION

Figure 1:
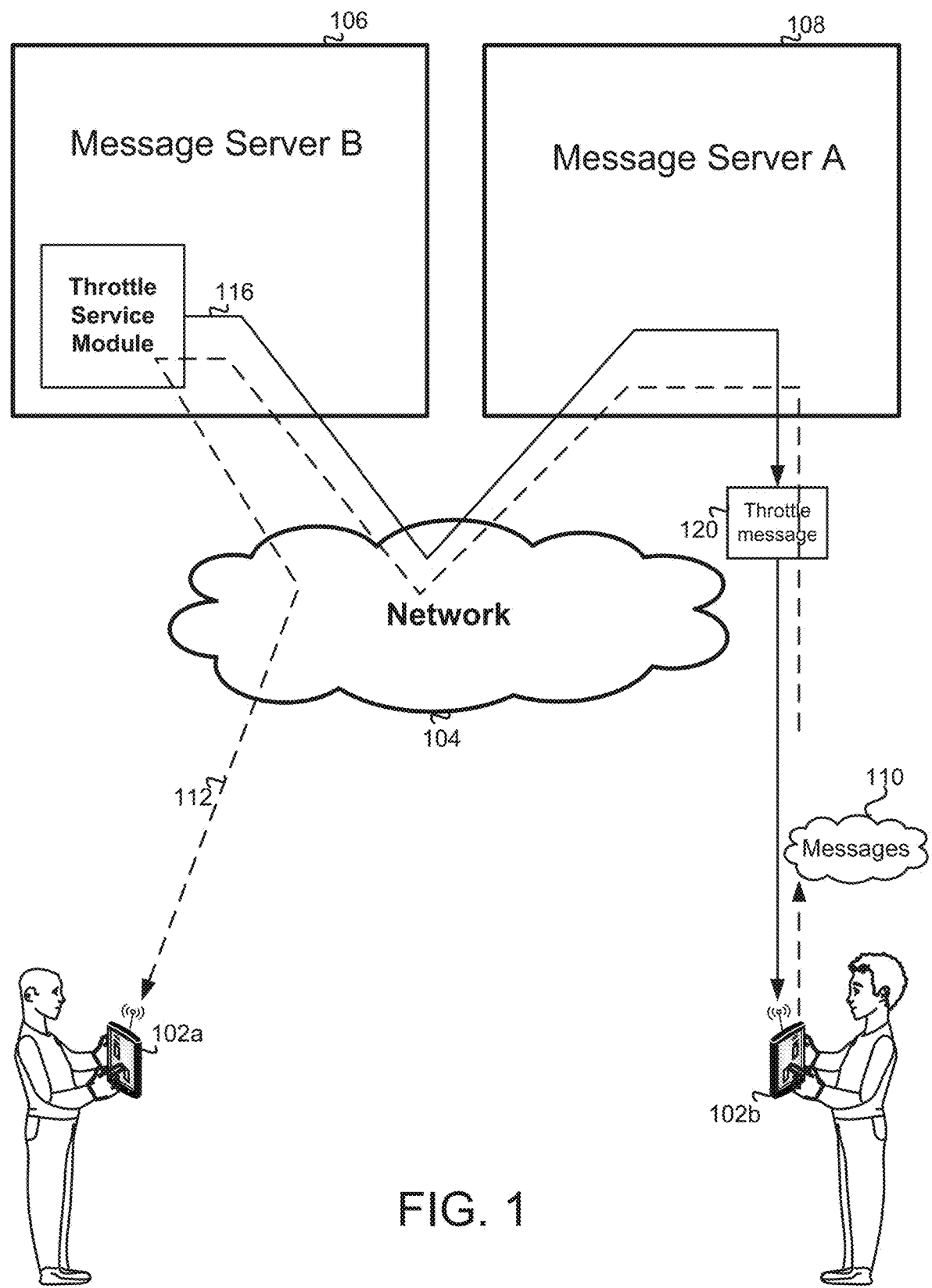
FIG. 1 is a system diagram of an inter-user communication system that exchanges messages (i.e., electronic messages) between users according to one embodiment.

The invention pertains to methods and systems for network-based messaging systems with database management for supporting based inter-user communications, such as via computing devices. The methods and systems facilitate improved message transmission management for more efficient communications. The methods and systems can provide enhanced electronic communications, such as via electronic mail or text messaging. Improved communication tools are provided to better manage and/or control communications. The computing devices can be personal communication/computing devices, such as mobile, portable or handheld computing devices (e.g., smart phone, a laptop, a tablet, etc.).

The various aspects, features, embodiments or implementations of the invention described herein can be used alone or in various combinations.

Embodiments of various aspects of the invention are discussed below with reference to figures. However, those skilled in the art will readily appreciate that the detailed description given herein with respect to these figures is for explanatory purposes as the invention extends beyond these limited embodiments.

One aspect of one or more embodiments of the invention pertains to a throttling action that can control communications.

A throttle serves as a way to limit or compact communications with respect to one or more users. The communications can, for example, be text messages, e-mail messages, or telephone calls. The throttle can limit communications in any of a variety of different ways. For example, one type of throttle can impose a limit on the number of messages per unit time. Another type of throttle can impose a size limit on messages. Another type of throttle can restrict or prevent content types, such as preventing videos or pictures, for a given sender or type of sender. For example, a throttle might completely prevent video and/or pictures from a sender, or might prevent video and/or pictures for a period of time (e.g., 1 hour), or might limit the quantity or size of pictures and/or video (e.g., 2 multimedia assets per 15 minutes; max size 1 MB). Another type of throttle can impose limitations dependent upon the time of day or location of recipient and/or sender of messages. Another type of throttle can be dependent on status of either sender or recipient. Still another type of throttle can be based on the social connection status of the sender with respect to the recipient (e.g., friends, important friend, less important friend, a friend of a friend, etc.). Further, types of throttles can be set by a user, e.g., such as by selecting an action to take with respect to a sender of a message, and/or setting rules for actions to take with respect to messages received from a particular sender or senders. In some embodiments, the rules can process or depend on one or more conditions that can direct when particular actions to impose throttle actions are to be applied. The conditions can be temporal (e.g., different actions for different times of day and/or days of the week), or based on a number of messages received, or based on the context of the message itself (e.g., urgency expressed by the sender in the message data), or based on relationship status of the sender to the receiving user, or combinations thereof. In one embodiment, throttle(s) that implement the rules and process the conditions can be set by the user via a user interface provided by a communications application. The processing of logic to implement the conditions can be executed by a processor of the device executing the application and rendering the user interface, or can be executed by one or more servers that provide cloud processing for communications applications, or by hybrid processing that includes processing operations on the device of the user and also processing operations on a server, e.g., via an application (app) having access to the Internet. Any of these different types of throttles can be used separately or in any combinations.

As one example, in the case of a recipient user and the sender user both being at their workplace, while sending messages, the communication applications being utilized by the sender and recipient can impose a throttle such that the sender and recipient users (which might modify their behavior) are managed to limit communications while at work (though such restrictions could be relaxed if, on break or lunch).

One example of a throttle is a limit type throttle in which the number of messages in a given amount of time is limited. For example, a limit type throttle might impose a limit of one text message per every five (5) minutes. The sender attempting to send a message, in violation of the limit type throttle, could be provided with a notification. The notification can notify the sender that the text message they are attempting to send is in violation of the limit type throttle and thus will not be sent or will be sent after the imposed throttle expires or is removed. That is, the limit type throttle can be configured to "bounce" or "defer sending" of a message being throttled. In another example, the throttle may act to generate a notification to the sender, indicating that the message was received, but will not be presented to the recipient until a later point in time. For instance, if a sender sends more than two (2) text messages within a period time, e.g., 5 minutes, and the recipient does not reply to either text message, the throttle can notify the sender that any additional messages will be collected and queued, and not shown or presented to the recipient until a period time passes, e.g., 15 minutes, 30 minutes, an hour, two hours, or some user configurable period to time. In this manner, if the sender deemed too active in sending messages to the recipient, a throttle can be imposed on the sender. The recipient, who knows this user is too active, can customized a throttle for that sender. This throttle can act to automatically send the sender a message, e.g., text, pre-recorded voice call or message, or text, noting that their first two messages were received, and their subsequent messages within a predetermined period of time, e.g., hour, will be queued and not presented to the recipient during that predetermined period of time. This throttle therefore acts to proactively encourage the active message sender to stop sending messages during the next hour or send less messages in the future, as they know they will be limited to two text messages. As noted above, throttle times and number of messages can be customized for different users.

In another embodiment, a method can be processed to examine a history of messages received from a user's contacts, which will enable the system to generate throttles or recommended throttles for the examined user contacts. In this examination, users that send frequent texts messages, frequent phone calls, etc., can be identified, and based on their historical contact patterns, the system can implement or recommend throttles for each user. In one embodiment, the system can group users into categories, e.g., based on their historical messaging activity and based on their relationship to the user and/or based on their social status or importance.

For instance, if an active messaging sender is the wife of the recipient, the recommended throttle may be relaxed to allow more messages to come in and be delivered to the recipient. If the active messaging sender is an advertiser or commercial entity, those messages may be throttled more aggressively. If the active messaging sender is work partner, the system may recommend a medium level throttle.

In still other embodiments, a throttle may be moderated based on the content of the message, e.g., such as by reading the text message and identifying context (or converting voicemails to text to identify context). Generally speaking, context may define what the message relates to by analyzing key words and/or strings of words. In some cases, context may be determined by analyzing multiple messages over period of time, e.g., to determine if a conversation is ongoing. In other embodiments, the determined context may automatically suggest to the user to change the throttle of the message or groups of messages, e.g., while a conversation is ongoing or the conversation relates to a topic that may be important or of relative importance to the recipient user.

In still other embodiments, a throttle being imposed can be overridden. For example, use of a code word or expression of urgency might wholly or partially override a throttle.

As another example, a throttle can be a time of day type throttle in which messages are limited or blocked/prevented based on the time of day at which a message is attempted to be sent. One attempting to send a message in violation of the time of day type throttle can be provided with the notification that the message is not permitted to be sent or will be deferred until sending is permitted.

In one embodiment, a time of day can be compared to a calendar of the recipient. If the calendar indicates that the recipient is currently in a meeting, is on vacation, is working out, is traveling, etc., the system may use this information to customize a notification response to a throttle. In some embodiments, to some senders, the system will provide more detail obtained from the calendar, e.g., the type of meeting the user is currently tied up in and/or the people with which the recipient is meeting with, and/or other contextual information. For instance, if the sender is the sender's wife, the details can be more detailed and/or informative based on calendar data. If the sender is just an acquaintance or a person not currently in the recipient's contact list, the response notification can be more generic. In addition or alternatively to a calendar, in one embodiment, the recipient status can be predicted such as by location, by social media postings (e.g., check-in"), and the like.

In one embodiment, a throttle can be imposed, and/or elevated to increased throttling in a "vacation mode." A recipient status can thus be denoted (e.g., manually by a user or automatically with reference to a calendar) as "on vacation" or the like, and such can trigger activation of a throttle or enhancing a throttle already imposed.

In some embodiments, in addition to or alternative to examining a calendar of the user, other digital sources of the user can be accessed. These digital sources can include the user's contact list, the use's online contacts, the user's friends lists from social networks, data obtained from a social network (e.g., such as the frequency of contact/messaging with the sender of the message, number of friends in common, context of communications or postings between the sender and recipient, number of "likes" posted to each other's social stream, etc.), data obtained from public or private databases, data obtained from a place of work (e.g., based on privilege access), and data generated from combining data from one or more of these digital sources. For instance, inferences can be made or validated by comparing the user's relationship as expressed in these difference digital sources. For example, the recipient's contact data may not have information that the sender is the recipient's wife, but from information obtained from a social network or posts and/or comments, it can deduced with a greater certainty score that the sender is indeed the recipient's wife. In some cases, the system may generate an inquiry message to the recipient asking "Bill, Is Jane your wife?" Still further, if the sender is identified to be a marketer (e.g., using caller ID, or by analyzing the content of the messages or both), the response can be more strict and to the point. This information, as noted above, can then be used to determine or suggest or recommend a throttle to apply to particular senders.

For purposes of one example, a notification response could display a message to the sender's device or play a recorded audio (e.g., in the recipient's voice or computer generated). One example notification message to the sender can be, without limitation: "Bill you have sent too many message recently, so your last message won't be delivered for 5 minutes." Another example notification message is "It's too late, so your messages are restricted." Still another example notification is "I'm working, so you messages will be delayed until after work."

In some embodiments, notification content can be customized by a user ahead of time. In other embodiments, notification content can be selected from a predefined list of notifications, which may insert the recipient's name (e.g., Bill), so as to appear custom. In other embodiments, recommended notifications can be suggested to the recipient, for use in regard to a given sender. For instance, if a sender sends several messages, and the recipient has not yet assigned a throttle to the sender, the system can suggest particular types of one or more throttles and/or options of responses for the sender. In other embodiments, the recipient can choose to send a response message to the sender based on availability in the recipient's calendar or other digital source. In still other embodiments, the response message can be automatically selected based on one or more determining factors, e.g., the time of day, day of the week, number of messages received, messages received over a period of time, content in the messages, context of message as determined from the message itself, importance of the sender, relationship of the sender to the recipient, and combinations thereof.

In some implementations, the user may provide a weighting as to which of the determining factors are more important. In some cases, the user may wish the calendar availability to take priority over the number of messages. In other cases, the recipient can set the system to allow unlimited messages when the calendar shows the recipient is available, but when the user is busy (e.g., booked for a meeting), the throttle can be applied. These options can be set by the user via a user interface on a communications application, or can be set periodically during use or interaction with incoming messages.

In some cases, the application and/or server can provide to the recipient suggestions on types of throttles to apply to certain senders. For instance, the system can suggest one or more custom replies. Once the throttle is set, if the throttle deems that a message will not be sent, an appropriate notification message is generated and communicated to the sender. As noted above, this processing avoids excess disturbances to the recipient. Additionally, this processing can be by a server, which can implement the throttling, can operate to avoid processing messages and sending communications that are not going to be read or are not desired by the recipient to be read, or would not be well received for one reason or another.

It is further noted that by not sending messages, or queuing messages for future sending as a group reduces computation by servers and devices. This reduction in computation can have the added technical effect of saving power at a server and/or data center resources, e.g., energy utilized to run a data center, air conditioning systems for the data center, storage, and the like.

Another example of a throttle is a content type throttle that can limit certain type or size of content. One type of content type throttle is a "no pictures" throttle. Another type of content type throttle is a "no audio" throttle. Still another type of content type throttle is a "no video" throttle. As an example of size of content, the size can be determined based on one or more multiple communications. For example, if the sender sends a series of messages, and the combined size of the content exceeds a threshold, the content type throttle can be applied. Another throttle can be to limit duration of audio or video content of messages.

Another example of a throttle is a workplace throttle. The work place throttle can operate to prevent, limit or defer communications, such as messaging, while a sender and/or recipient are at work. The determination of whether a user is at work can be based on a location of the user or can be based on a normal work schedule or based on a user setting that they are at work. One example method for identifying location of the sender and/or the recipient may be by examining the global positioning system (GPS) data of one or both devices involved in the communication. If the device is not a wireless device, Internet Protocol (IP) addresses associated with machines sending or receiving messages may be examined. In other embodiments, the content of the communications can examined to identify conversation data that identifies a place and/or location.

Another example of a throttle is a driving throttle. The driving throttle can operate automatically to prevent or defer communications while the sender or recipient are considered in a motor vehicle or, more particularly, driving a motor vehicle. Various techniques and/or devices can be used to determine when the driving throttle should be imposed, such as an accelerometer, location detector, etc.

A graphical user interface can be utilized to assist the user in setting or resetting a throttle. A throttle can be implemented to be applicable to all incoming messages or applicable to only incoming messages from certain users. The throttle can be set to be generally applicable, or can be set in accordance with a preference setting and thereafter utilized. These preference settings can be turned on and off and/or overwritten with other user selections, if desired. Additionally or alternatively, in the context of a messaging user interface, such as chat or text, messaging interface, user controls can be provided to enable a recipient user to easily impose a throttle on a specific sender user.

As mentioned above, the types of throttles can also be suggested to a recipient, based on the identify of a sender. As used herein, a throttle broadly defines what action to take in regard to a message or communication. The action taken includes, for example, whether to send and/or deliver a message to a recipient when originating from a particular sender and a particular time, or based on some limit on communications, or combinations of factors discussed in more detail above. The action taken can also be viewed to include a notification provided to the sender, e.g., notifying the sender of the action that will be taken in regard to their sent message or messages. As seen from the recipient, once a throttle is in place and active, there will be cases where messages are not received until some later point in time, and when received, maybe a group of messages are delivered at the same time. In some case, the recipient may never receive a message, if the sender is blocked and notified or just blocked. In some cases, some messages are received, e.g., one or more, and then subsequent ones are held or blocked. If a message is blocked, the sender can be prevented from entering or sending another message, or if permitted to enter and send a message, the message can be held in a sender queue and then later sent (after throttle expires or ends), optionally, the sender could then be queried as to whether the message should still be sent at that time.

Further, setting the preferences can be dynamic, e.g., via the message stream or message listing. For instance, if the user is viewing messages in an inbox, an action tag can be applied (e.g., displayed) next to the message or messages to define the throttle to be applied (or available to be applied) for the sender. Further, the types of throttles to apply for particular senders can be customized, e.g., by the user or by the system based on the analysis described above.

Accordingly, setting a throttle based on a preference setting can be computer-implemented such that if the conditions associated with the preference setting are met, then the corresponding throttle can be automatically imposed. For example, a user deemed to be driving can have the driving throttle imposed on their communications. As another example, if a sender user has sent "too many" messages in a short amount of time, then a throttle can be automatically imposed. For example, the preference setting might be a limit (e.g., threshold) of (i) 2 messages in 5 minutes, (ii) more than two messages, or (iii) collective messages exceed x-bytes, etc. As another example, for a workplace throttle, the throttle can impose a limit of 5 messages per hour during working hours, unless on break.

FIG. 1 is a system diagram of an inter-user communication system 100 that exchanges messages (i.e., electronic messages) between users according to one embodiment. The inter-user communication system 100 illustrates a first user interacting with a computing device 102a, and a second user interacting with a computing device 102b. The inter-user communication system 100 can include a network 104, such as a global network, wide area network or local network, that supports data transmission. The inter-user communication system 100 also includes a message server B 106 and a message server A 108. As an example of the operation of the inter-user communication system 100, the second user can interact with the computing device 102b to prepare a message 110 that is to be sent to the first user, namely, to the computing device 102a being used by the first user. In doing so, the message server A receives the message 110 can delivers it to the message server B via the network 104. At the message server B, the message 110 can be processed by a throttle service module 112. The throttle service module 112 can determine whether the message 110 is to be presented to the first user (e.g., via the computing device 102a) or "throttled" (e.g., so as to defer such delivery). In general, the message 110 can be delivered to the computing device 102a via link 114 if the throttle service module 112 determines that a "throttle" is not being imposed on the message 110. On the other hand, if the throttle service module 112 determines that a "throttle" is being imposed on the message 110 then the delivery of the message 110 to the computing device 102a is deferred according to the throttle characteristics, and a throttle message 120 can be sent to the message server A and/or computing device 102b to advise that the message 110 (and/or the second user) is being "throttled."

The nature of the throttling and its institution are described in greater detail below. Also, it should be understood that the message server A may reside on the computing device 102b or as a cloud-based or network-based resource, and that the message server B may reside on the computing device 102a or as a cloud-based or network-based resource. The message servers A and B can also be provided as a single message server.

Figure 2:
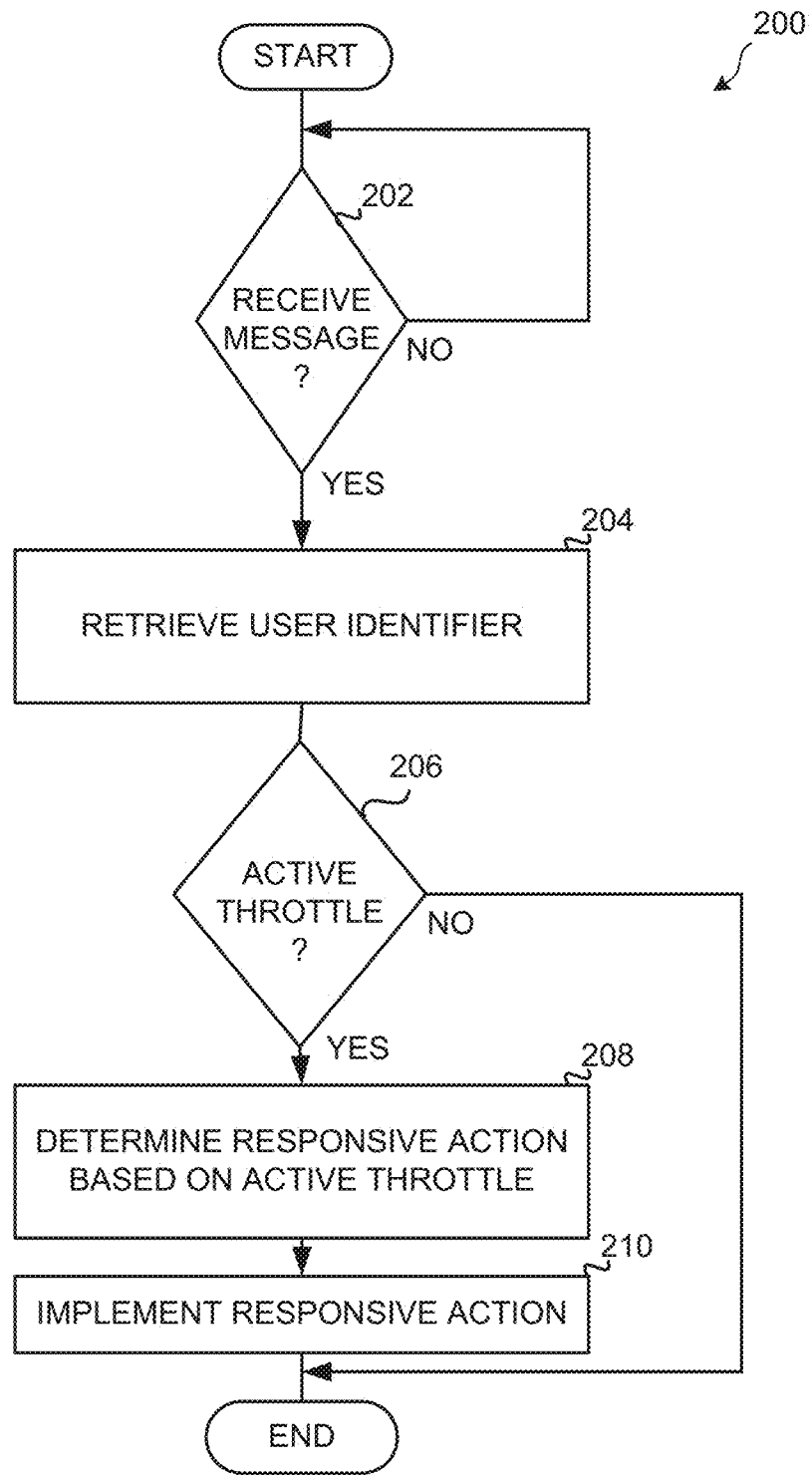
FIG. 2 is a flow diagram of a throttle process according to one embodiment.

FIG. 2 is a flow diagram of a throttle process 200 according to one embodiment. The throttle process 200 can, for example, be performed by a computing device. The computing device typically supports user communications over one or more networks in a wired and/or wireless manner. The user communications can be voice/video calls or messages. Examples of messages include email messages or text messages (i.e., instant messages, chat messages).

The throttle process 200 can begin with a decision 202 that determines whether a message has been received. In one implementation, the message, if received, is from another user that has initiated the message using a remote computing device that is able to communicate over one more networks to the computing device operating the throttle process 200. In another implementation, the message, if received, is from a user of the computing device.

When the decision 202 determines that a message has not been received, the throttle process 200 can await the receipt of an incoming message. On the other hand, when the decision 202 determines that a message has been received, a decision 206 can determine whether an active throttle exists for the user associated with the incoming chat message. When the decision 206 determines that there is an active throttle for the user associated with the incoming message, a responsive action can be determined 208 based on the active throttle. Here, the throttle process 200 can support one or more responsive actions to an active throttle. In addition, there can be one or more different types of available active throttles that can be activated or implemented for a particular user. After the responsive action has been determined 208, the responsive action can be implemented 210. There are various different responsive actions that can be implemented 210 to provide the throttling being imposed on the messages associated with the particular user. Following the block 210, the throttle process 200 can end. In addition, when the decision 206 determines that an active throttle is not presently associated with the user of the incoming message, the throttle process 200 can end.

The throttle process 200 is, for example, implemented on a computing device associated with the recipient of an incoming chat message. However, in an alternative or complementary embodiment, a throttle process (same or similar to the throttle process 200) could be implemented on a computing device associated with a sender of a message. In such case, an active throttle could have a responsive action that prevents, defers, alters or delays sending of an outgoing message. Further, in another alternative or complementary embodiment, a throttle process (same or similar to the throttle process 200) could be implemented on a computing device of a central server system, which can be remote from a computing device used by sender or receiver.

The throttle process 200 generally refers to messages. However, it should be understood that more generally the throttle process 200 can be implemented for electronic messages, such as email, chat, voicemail, VoIP, etc. The throttle process 200 is particularly well suited for text (e.g., chat) messages.

Figure 3:
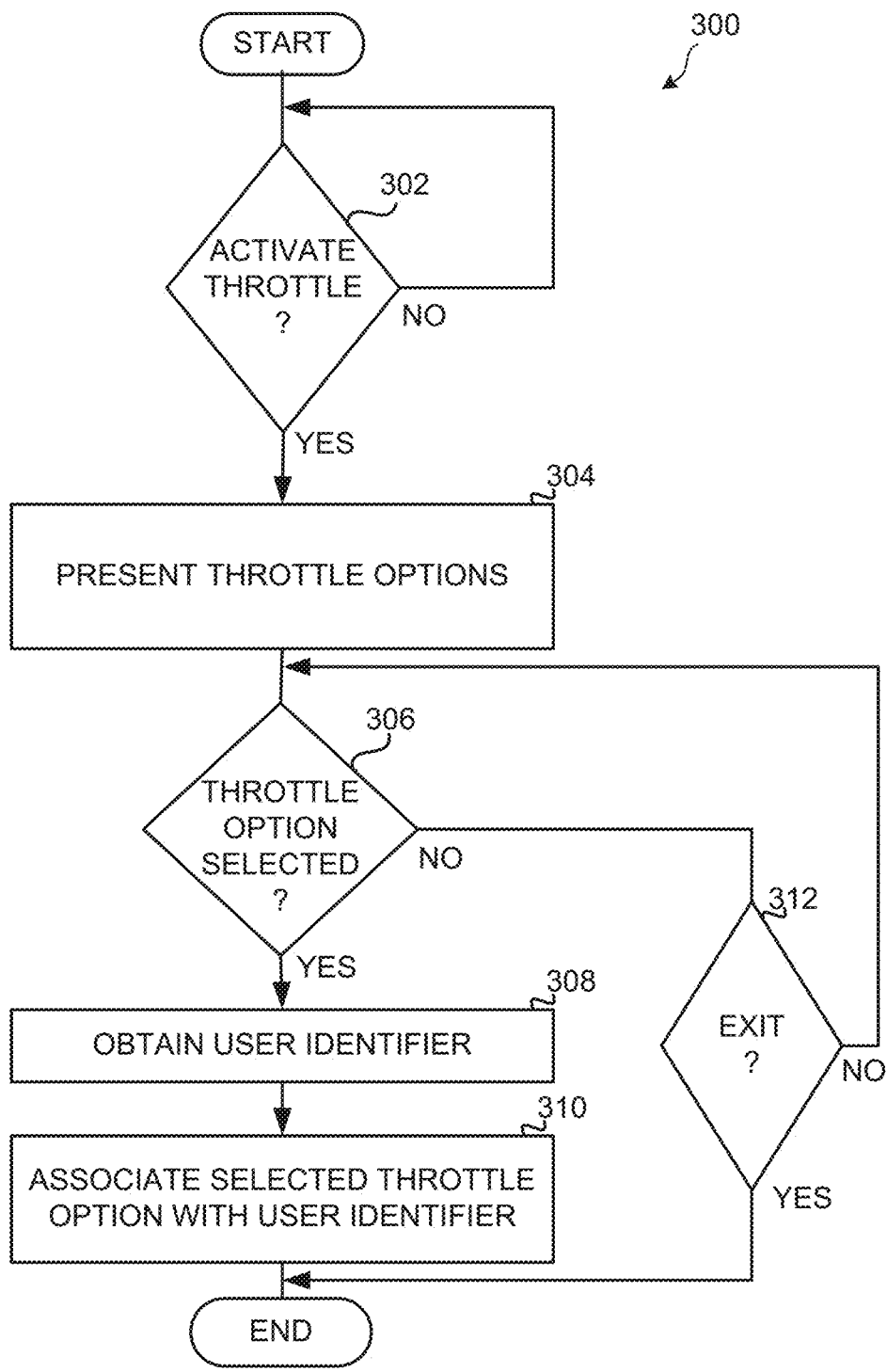
FIG. 3 is a flow diagram of a throttle activation process according to one embodiment.

FIG. 3 is a flow diagram of a throttle activation process 300 according to one embodiment. The throttle activation process 300 can be implemented on a computing device. The computing device typically supports user communications over one or more networks in a wired and/or wireless manner. The user communications can be voice/video calls or messages, email messages, or text messages (i.e., instant messages, chat messages).

The throttle activation process 300 can begin with a decision 302 that determines whether a throttle is to be activated. When the decision 302 determines that a throttle is not to be activated, the throttle activation process 300 awaits the need to activate a throttle. On the other hand, when the decision 302 determines that a throttle is to be activated, throttle options can be presented 304. For example, the throttle options that are available to be activated can be presented 304 to a user of the computing device, such as by displaying the throttle options on a display screen of the computing device. As mentioned above, the throttle options can be recommendations by the system, or can be provided from the user's custom throttles, or hybrid throttles that include messages/notifications that are user crafted or user modified.

In some embodiments, the throttles options can be implemented in response to voice commands. For instance, if the user listens to a voicemail, at the end of the voicemail the user can say "Apply throttle," and the system can provide voice read options for the user to select and apply. Accordingly, it should be understood that any input of data, selection, setting, preference, and interaction can be via voice, or combinations of voice and/or user input (e.g., text, selection boxes, touch screen inputs, gestures, etc.).

Next, a decision 306 can determine whether a throttle option has been selected. When the decision 306 determines that a throttle option has been selected, a user identifier can be obtained 308. The user identifier being obtained 308 is the user identifier that is associated with a user for which the throttle option is to be imposed. That is, the throttle to be activated is a throttle that is to be placed on the user identified by the user identifier. Thereafter, the selected throttle option can be associated 310 with the user identifier. For example, the selected throttle option can be stored in a database 511 (e.g., see FIG. 5A) in association with the user identifier, which stores an indication that the type of throttle specified by the selected throttle option is to be imposed on the user associated with the user identifier. In one embodiment, the user identifier is identified using metadata associated with the message. For instance, the message may not identify a name of the sender, but may identify a phone number. In some embodiments, open databases accessible over the Internet may be accessed to obtain additional identifying data regarding who the user is, where the message originated, or the like. The user identifier can also simply be a phone number, chat ID, a name, or combinations thereof.

Furthermore, the user identifier may be stored in a database that is separate from a database that defines the throttle to be applied or options of throttles that can be applied. In some embodiments, one or more servers can be implemented to provide the association between the user identifier and the throttle to be applied or throttles recommended (e.g., based on actions of the sender and parameters, conditions, settings or rules set by the recipient). In some embodiments, the selected throttle set for a sender having the user identifier can be processed and applied locally at the user's device. For example, the message may be received by the recipient's device, but is hidden to the recipient until the throttle logic determines that presentation (e.g., surfacing) should occur.

In such configurations, some processing can be performed on one or more remote servers connected to the Internet and some of the processing is performed locally by the device of the recipient, e.g., for implementing the throttle actions. As noted, these processes may include, for example, to determine user identifiers, identify throttles to apply, suggest throttles, modify throttles, takes the actions of the throttles, send notifications to the sender notifying of the applied throttle, save a history of applied actions based on set throttles, etc. Still further, in some configurations, throttles set for particular senders can be recommended for other senders that have similar sending or interaction profiles, e.g., number of messages, frequency of messages, length of messages, time of day sent, and/or type of content expressed in the messages. Following the block 310, the throttle activation process 300 can end.

On the other hand, when the decision 306 determines that a throttle option has not been selected, a decision 312 can determine whether the throttle activation process 300 is to be exited. If the decision 312 determines that the throttle activation process 300 is not to be exited, the throttle activation process 300 returns to repeat the decision 306 and subsequent blocks. However, if the decision 312 determines that the throttle activation process 300 is to be exited, then the throttle activation process 300 can end.

Another aspect of one or more embodiments of the invention pertains to summarizing of user communications. The summarizing can serve to condense or replace prior user communications. The summarizing can serve to provide more efficient communications when prior user communications are not able to be read in real-time, or are sent during a blocking period as set by a throttle.

It should be understood that the summarizing features are also applicable to voicemail messages, not just original text-type messages. In the case of voicemail messages, the messages can be converted to text, and if several messages repeat the same content, a new voicemail can be created which summarizes the pertinent content. Optionally, if the user wishes to listen to the original messages, an option can be provided to allow navigation to listen to such messages.

Figure 4A:
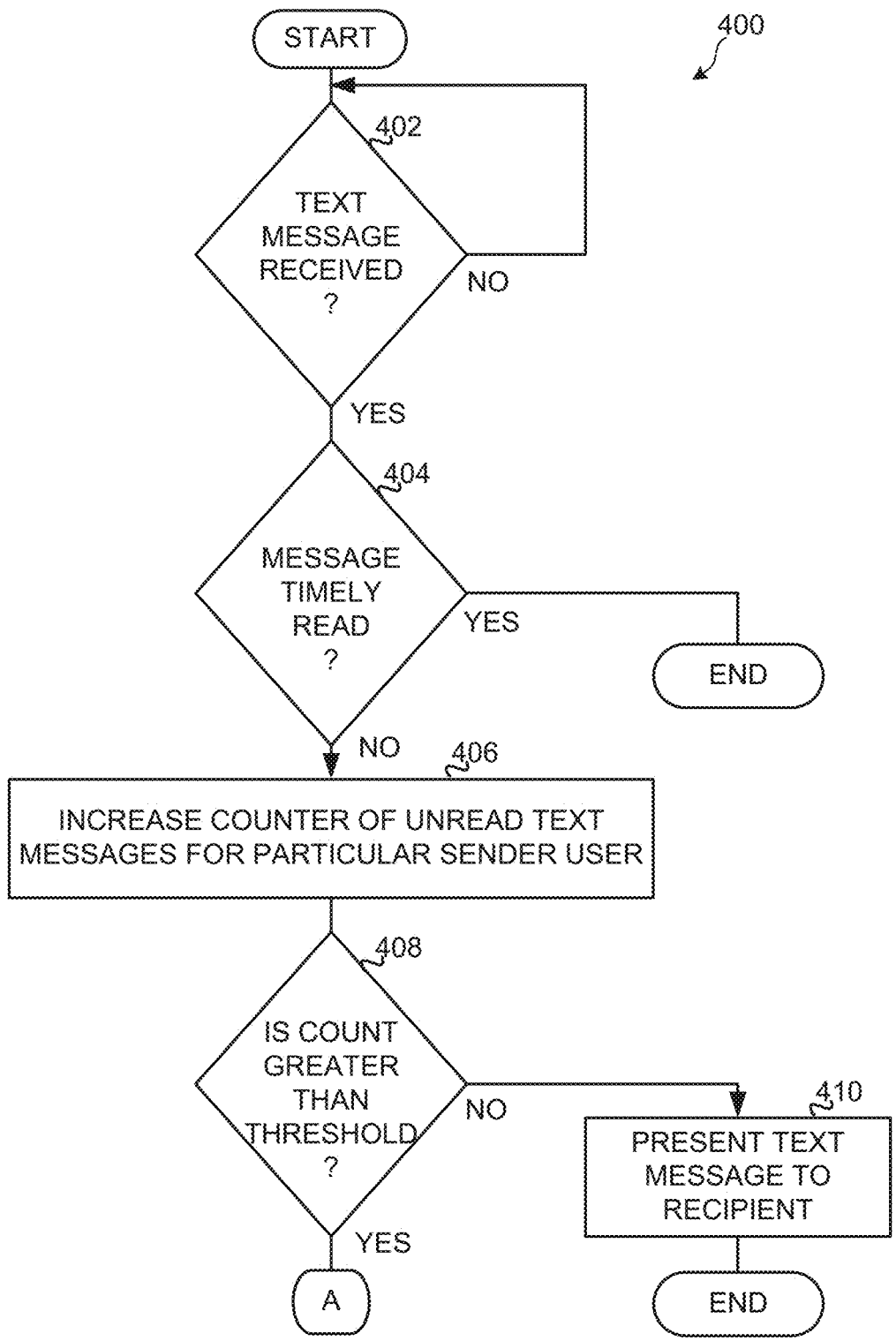
FIGS. 4A and 4B are flow diagrams of a summary message process according to one embodiment.
Figure 4B:
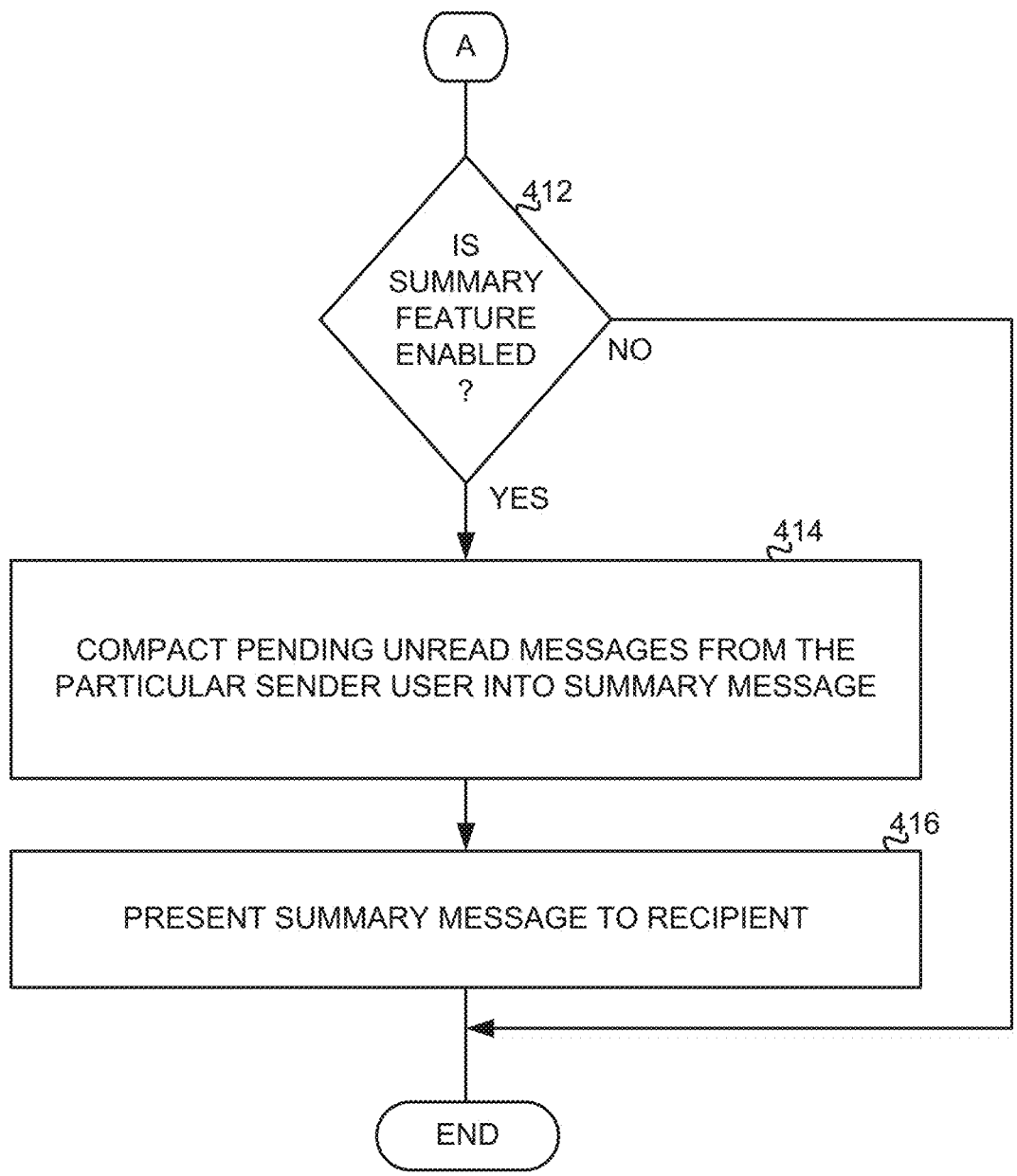

FIGS. 4A and 4B are flow diagrams of a summary message process 400 according to one embodiment. The summary message process 400 can be implemented on a computing device. The computing device typically supports electronic user communications over one or more networks in a wired and/or wireless manner. As noted above, the user communications can be voice/video messages, email messages, or text messages (i.e., instant messages, chat messages). The summary message process 400 is described further below with regard to text messages, as an exemplary type of electronic message.

The summary message process 400 can begin with a decision 402 that determines whether a text message has been received. When the decision 402 determines that a text message has not yet been received, the summary message process 400 can await receipt of a text message. Once the decision 402 determines that a text message has been received, a decision 404 can determine whether the text message has been timely read. That is, even though a text message has been received by the computing device, the user may not interact with the computing device until sometime later to actually view the text message. In some cases, the user (recipient) might never actually view the text message. When the decision 404 determines that the text message has been timely read, then the summary message process 400 can promptly end without needing to provide a summary message (at least, as to that text message).

On the other hand, when the decision 404 determines that the text message has not been timely read, a counter of unread text messages for a particular sender user can be increased 406. The counter serves as an indication of the degree to which unread text messages from the particular sender user have been received but have not been read by the recipient user. A decision 408 can then determine whether the count (provided by the counter) is greater than a threshold. The threshold is typically a predetermined threshold that identifies a number beyond which a summary message is deemed appropriate. When the decision 408 determines that the count is not greater than the threshold, then the text message can be presented 410 to the recipient. In this case, the number of unread text messages for the particular sender user has not exceeded the threshold, and, as a result, a summary message is not provided, but the text message is made available to the recipient, typically in a normal fashion. Following the block 410, the summary message process 400 can end without having produced a summary message as to at least a text message.

Alternatively, when the decision 408 determines that the count does exceed the threshold, then additional processing can be performed to produce a summary message for the recipient. In particular, the additional processing can include a decision 412 that determines whether a summary feature is enabled. Here, in one embodiment, the computing device receiving the text message can be configured to enable or disable the summary feature. When the summary feature is enabled, a summary message can be produced and made available to the recipient at appropriate times. When the feature is active, the an option can be provided to allow the user access to the original messages if desired. This may be useful in case the summary does not include certain details that are still needed. In some cases, if the original messages are not accessed for a pre-determined period of time (e.g., 3 months), the original messages may be erased and removed from storage.

Still further, in one embodiment, the summary function can automatically be set based on throttle processing. For instance, if the sender has sent seven (7) short text messages over a period of 2 minutes, the throttle may prevent sending the text messages one at a time. Instead, the seven (7) short text messages are compacted into one text message. In this example, the processing may also automatically reply to the sender asking that text messages be limited or be written in a more concise. By providing the notification messages to the sender of the preferences of the recipient, it is more likely that the recipient will reply timely, and/or will not be annoyed. Furthermore, the time at which the summarized message is delivered to the recipient may be based on the throttle applied to the sender by the recipient.

As several examples of summarizing messages, see the following three texts: (a) "hey, U there?" (b) "?" (c) "dude, pls reply." Here, a logic or reasoning engine can piece together the words and attempt to make contextual sense of each text individually, and collectively in order. From (a), the system may determine that the sender is asking if the recipient is available. From (b) the system may determine that the sender is repeating a question. From (c) the system may determine that the sender wants a reply. Contextually analyzing (a)-(c) can yield a summary of "If you are available, I need your reply." In still other embodiments, the summarizing may simply combine the three text messages into one, like: "hey, U there??, dude, pls reply" In yet another embodiment, the summarizing may blend the three messages and add data known to the system, such as user names, such as: "Hey Bill, Are you available? Please reply."

In other implementations, the methods of summarizing may be hybrids of those described above.

When the summary feature is not enabled, summary messages are not presented and thus the messages are simply made available to the user in a normal fashion. In one implementation, when the summary feature is enabled, then any pending unread messages from the particular sender user can be compacted 414 into a summary message. Then, the summary message can be presented 416 to the recipient. The recipient may, at that time, review the summary message or the user may review the summary message at a later point in time. Following the block 416, the summary message process 400 can end. Additionally, when the decision 412 determines that the summary feature is not enabled (i.e., when disabled), the summary message process 400 can also end without having produced a summary message.

A summary message can be generated or produced in any of a number of different ways.

One way a summary message can be generated is by automatic processing in which a set of prior unread messages from a given sender user can be compacted. For example, like messages can be compressed through elimination of substantially similar messages. As another example, messages with little or no meaningful comment can be eliminated.

Another way a summary message can be generated is by further communication with the sender user. As one example, the system can query the sender user to provide a summary, approve a summary, or influence a summary. In one particular example, the system can examine the prior unread messages from a given sender user and generate a proposed summary message, which can then be sent via text messaging, to the sender user for approval. In another particular example, the system can retrieve or retract the prior unread messages from a given sender user and ask the recipient user to return a desired summary message.

Still another way a summary message can be generated is a default message. As one example, the system can replace the prior unread message from a particular sender user with a default message. The default message can state that message(s) were receive but were retracted since not read or responded to. As one example, the default message might state (in place of the prior unread messages) that "Sorry, you missed my x messages send between 5:10 pm and 7:21 pm," or "Sorry, you missed y messages sent by Bob during your 2 pm meeting."

In one embodiment, the summarizing function can implement contextual dictionaries, local dialect dictionaries, text slang dictionaries, and reasoning engines to make decisions on possible re-wording or re-statement of phrases.

Another benefit of summarizing messages is reduction of processing power by servers and devices to process inefficient messages that may not be complete thoughts or make sense if sent individually. The reduction in processing can, in some implementations, provide for substantial reductions in power utilization, storage access and transmission, etc. For example, data centers that store messages, process messages and send messages can reduce their processing bandwidth spent on small messages by throttling users that send repeated messages. In the data center, the processing of a message, even when the message is small, requires utilization of storage, processors to access storage, and database accesses so that the messages can be associated with senders and receivers. By throttling and/or summarizing, significant savings in data center processing can be achieved.

Figure 4C:
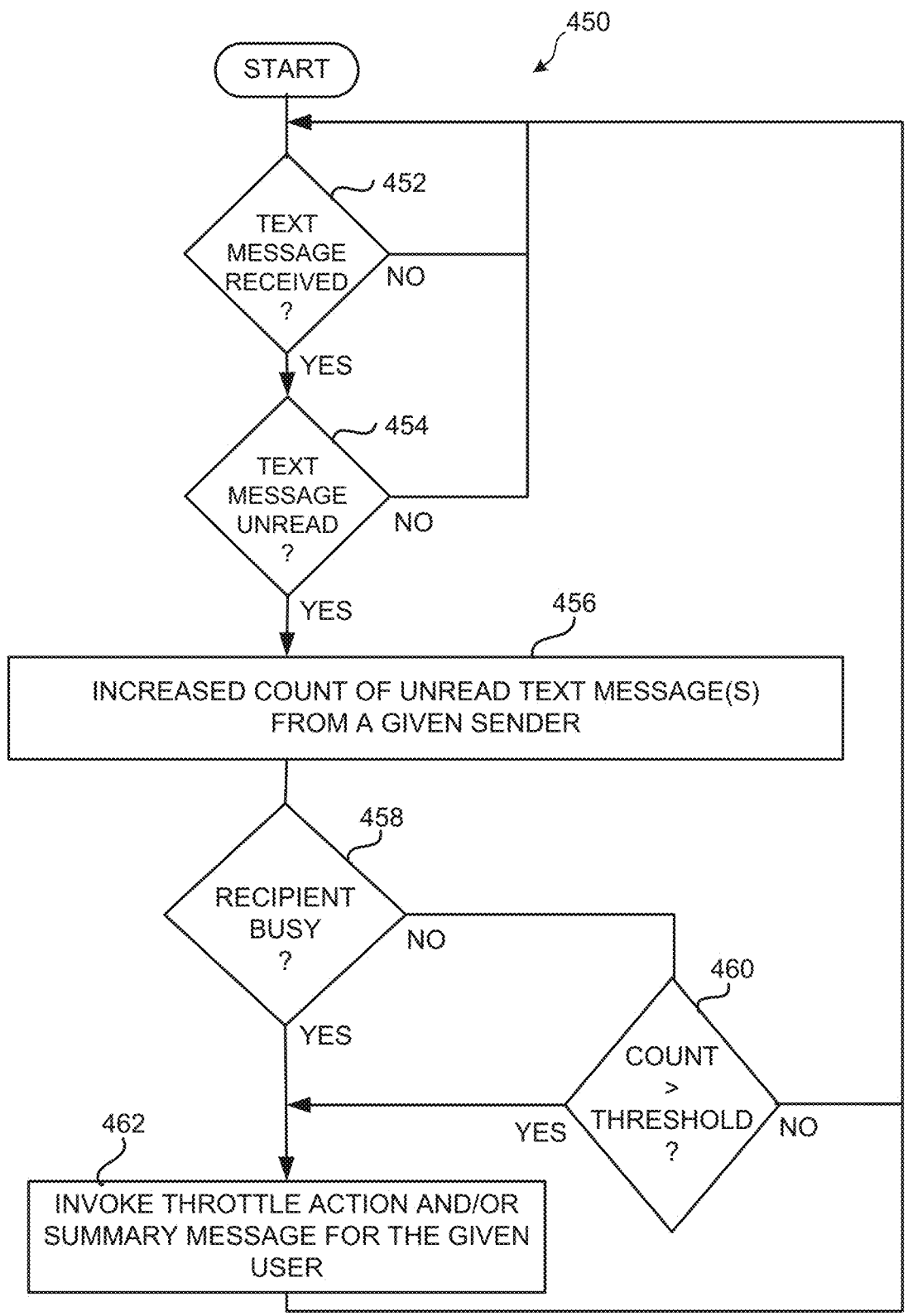
FIG. 4C is a flow diagram of a test message management process according to one embodiment.

FIG. 4C is a flow diagram of a test message management process 450 according to one embodiment. The test message management process 450 can be performed by a computing device, which can be either a client-side computing device or a central or cloud server computing device.

The test message management process 450 can determine 452 whether a text message has been received. When the decision 452 determines that a text message has not been received, the test message management process 450 can await receipt of a text message. On the other hand, when the decision 452 determines that a text message has been received, then a decision 454 can determine whether the text message remains unread. Typically, between the decision 452 and the decision 454 other processing or other delay is provided such that, in effect, the recipient has an opportunity to view the received text message if they are available and so desire to view the text message. When the decision 454 determines that the text message has been read, the text message management process 450 can return to repeat the decision 452 so that a subsequent text message can be processed.

On the other hand, when the decision 454 determines that the text message remains unread, additional processing can be performed to determine whether the sender of the text message is to be throttled and/or whether a summary message should instead be presented to the recipient. In this regard, a count of unread text message(s) from a given sender can be increased 456 (e.g., incremented by one). Next, a decision 458 can determine whether the recipient is busy. The determination 458 of whether the recipient is busy can be determined by way of a user input from the recipient and/or from a computer-based estimation of whether the recipient is busy. The computer-based estimation of whether the recipient is busy can be based on the recipient's interaction with the computing device associated with the recipient. When the decision 458 determines that the recipient is not busy, a decision 460 determines whether the count associated with the sender is greater than a threshold. The threshold can be a general threshold or can be a threshold particularly established for the sender or persons in a common category (e.g., friends, family, business associates, etc.). When the decision 460 determines that the count is not greater than the threshold, then the text message management process 450 can return to repeat the decision 452 so that a subsequent text message can be processed. In this regard, since the count does not exceed the threshold, neither a throttle action nor a summary message need be provided, according to this embodiment. Alternatively, when the decision 460 determines that the count is greater than the threshold, then a throttle action and or summary message can be invoked 462 for the given user. Following the block 462, the text message management process 450 can return to repeat the decision 452 so that subsequent text messages can be similarly processed.

Figure 4D:
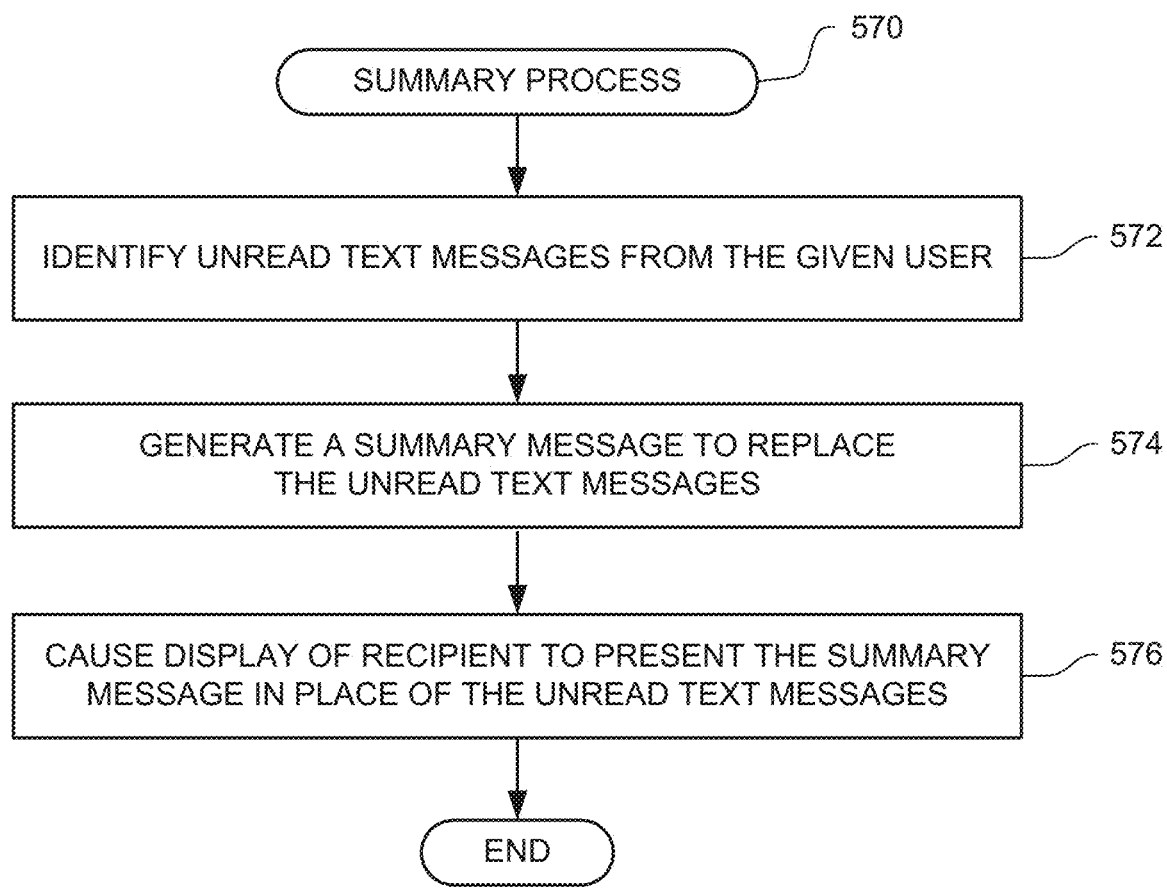
FIG. 4D illustrates a flow diagram of a summary process according to one embodiment.

FIG. 4D illustrates a flow diagram of a summary process 570 according to one embodiment. The summary process 570 is, for example, processing that can be performed to invoke a summary message. The summary process 570 is suitable for use in block 462 illustrated in FIG. 4C for invoking a summary message. The summary process 570 can identify 572 unread text messages from the given user (i.e., sender) to a recipient. Then, a summary message can be generated 574 to replace the unread text messages from the given user to the recipient. The summary message can be generated automatically or through user assistance, as discussed above. Thereafter, the display of the computing device associated with the recipient can be caused 576 to present the summary message in place of the unread text messages. Following the block 576, the summary message has been presented to the recipient and the summary process 570 can end.

In one embodiment, the sender is able to preview a proposed summary message, and then if the sender approves the proposed summary message, the proposed summary message can be used as the summary message. In the same or another embodiment, the sender is able to edit a proposed summary message (e.g., through interaction with the sender's computing device), and then, following the editing, the edited proposed summary message can be used as a summary message. For example, the sender can be assisted to create or edit a summary message (through access to a cloud server and/or through use of the sender's computing device) which allows a summary message to be generated prior to being send to the recipient.

Figure 4E:
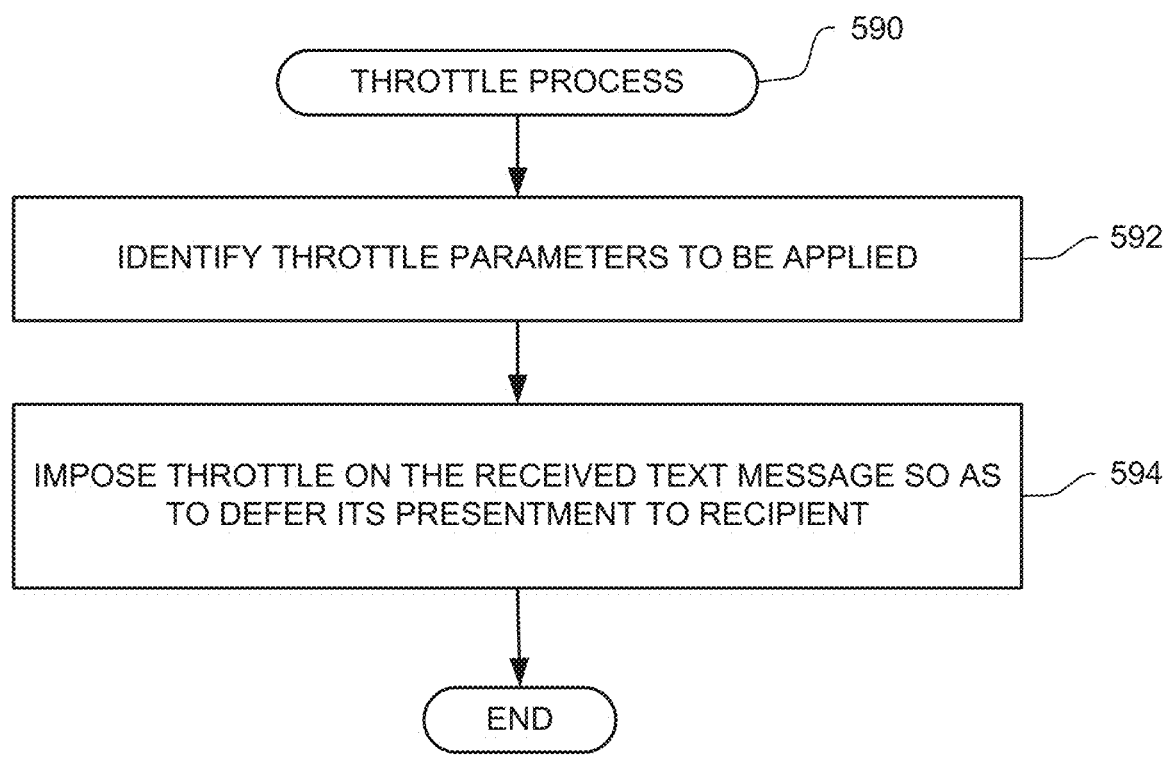
FIG. 4E illustrates a flow diagram of a throttle process according to one embodiment.

FIG. 4E illustrates a flow diagram of a throttle process 590 according to one embodiment. The throttle process 590 is, for example, processing that can be performed to invoke a throttle on a given user (i.e., sender) that has sent text messages to the recipient. The throttle process 590 is suitable for use in block 462 illustrated in FIG. 4C for invoking a throttle action. The throttle process 590 can identify 592 throttle parameters to be applied. Then, a throttle can be imposed 594 on the received text message (or its sender) so as to defer its presentment of the received text message to the recipient. Following the block 594, the throttle process 590 can end.

It should be understood that the throttle processing and/or the imposition of a throttle on text messages from a given sender can be achieved by one or more computing devices. In other words, such processing can be performed by client-side computing device associated with the sender, the receiver, some intermediate computing device (whether in the cloud, the Internet, local network or otherwise), or some combination thereof.

In another embodiment, messages exchanged between users can be monitored for lifetime (e.g., message lifetime). For example, a recipient can define a lifetime that defines how long the message will be saved before being deleted. When a message is deleted, the message will be deleted in the local device as well as the sending server, to eliminate a record of the message or conversation. In some embodiments, a throttle can include a condition for lifetime of a message for communication with a recipient. For example, the recipient can tag certain senders as senders for which communications should not be saved and should be deleted from the sender's records and storage, from the communicating network entity (i.e., phone company or communication provider) and from the recipient's devices and records. In one embodiment, the communicating entity can still record usage record without date and time to allow billing, but specific metadata regarding calls made at times, dates and receiving party are removed from storage and history.

To implement a lifetime for a conversation or message, in one embodiment, the recipient can set a lifetime that requests the sender to agree to a lifetime for the message or messages, which causes the sender's devices and communication services to adhere to the setting. At the same time, if the sender agrees to the lifetime, the recipient's device and services will also implement the lifetime. Once this agreement is set between the communicating parties, the parties can communicate using messages that will be expunged from all records after the lifetime expires. The lifetime can be, for instance, within a predetermined time of being received, whether read or not. Alternatively, the lifetime can be, for instance, within a predetermined period of time after being read by the recipient.

In particular embodiments, the lifetime is pre-assigned to particular recipients. If the recipients have previously agreed to the lifetime, i.e., life of message limits, subsequent communications between the users will also adhere to the lifetime. It should be understood that the lifetime can also apply to electronic messages, including voicemail messages, video chats, voice chats, text chats and email communications.

In one embodiment, email communications that adhere to a lifetime can implement an intermediary server that process the email messages between a device of the sender and a device of the recipient. For example, if a lifetime has been assigned for email communications, when an email arrives in an inbox, selection of the email can launch a window or iframe that allows reading of the email as well as composing of a response to the email. The email, in this example, is not actually delivered to the recipient's inbox, but is actually just a link to an online email client that manages the communications between the parties that agreed to the lifetime. In this example, the remotely hosted email client can hold the email, email string, email conversation, etc., for a limited period of time as set by the lifetime.

The limited period of time can be, for example, 30 minutes, 1 hour, 2 hours, 1 day, 2 days, one week, one month, etc. In some examples, either user can decide at any time to delete permanently the email or conversation of emails. In this manner, the emails are not saved in the client or the server. Further, the lifetime can be dynamically set based on identity of the sender of an email or on identity of the recipient of an email.

In further embodiments, depending on sensitivity of content discussed, a lifetime can be automatically applied. For example, if the content of an email appears to use sensitive wording or language, a lifetime can be suggested to both the sender and the recipient to agree on a lifetime. In some embodiments, a business can set rules for applying lifetime, depending the sensitivity of the communications or the persons involved in the communications.

Figure 5A:
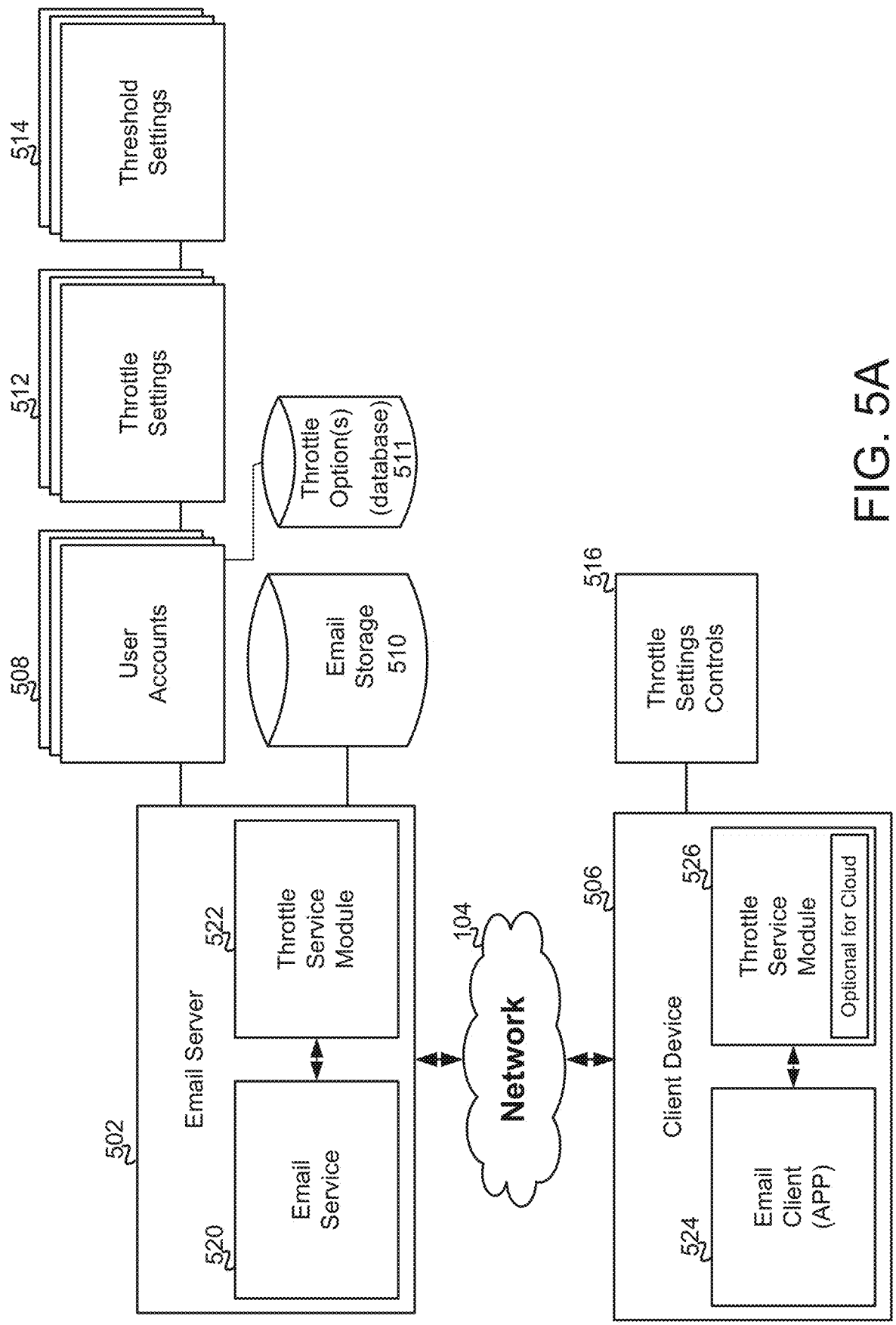
FIG. 5A illustrates a system diagram of an email server that is in communication with a client device over a network, according to one embodiment.

FIG. 5A illustrates a system diagram of an email server 502 that is in communication with a client device 506 over a network 104, according to one embodiment. The email server 502 may be a hosted server that manages email messages for various accounts, such as for the user of client device 506. In one example, the email server 502 may be a locally hosted server managed by an organization, e.g., a company for its employees. In another example, the email server 502 may be an internet hosted server that provides email services for individuals or group of individuals. In one embodiment, the email server 502 has access to storage, such as email storage 510 (e.g., used to store messages for those users of its provided services). In still another example, the email server 502 may be part of a set of servers or systems managed by an Internet company, e.g., which provide free, partially paid for, or sponsored email services. In one example, the email server 502 may be integrated with an email service 520 for processing emails, e.g., sending, replying, managing email threads, forwarding, saving, drafts, etc. In one embodiment, the email service 520 may be in communication with throttle service module 522. Throttle service module 522 may include logic and program instructions for managing the throttle operations described herein. The throttle service module 522 may be a plug-in or may be integrated into the email service 520 logic.

As shown, the client device may have its own email client 524, which may be an application (app). In another embodiment, the email client 524 may be processed entirely on the email server 502. In still other embodiments, the email client 524 provides the user interfaces for allowing the client to use email functions. In the embodiment shown, the throttle service module 526 may be executed on the client device 506. In one embodiment, the throttle service module 526 may just be executed on the email server 502. In one example, the client device 506 may be provide with a thin client for executing the email client 524 and for allowing users to interface with throttle setting controls 516. At the client device 506, the user can decide how to apply throttles to different people that may be communicating with the user. These settings are then communicated to the email server 502, which can associate the settings to the user account 508, throttle settings 512 and threshold settings 514. In one embodiment, the user accounts can be interfaced with a database 511, which may be used to save throttle options of users.

Figure 5B:
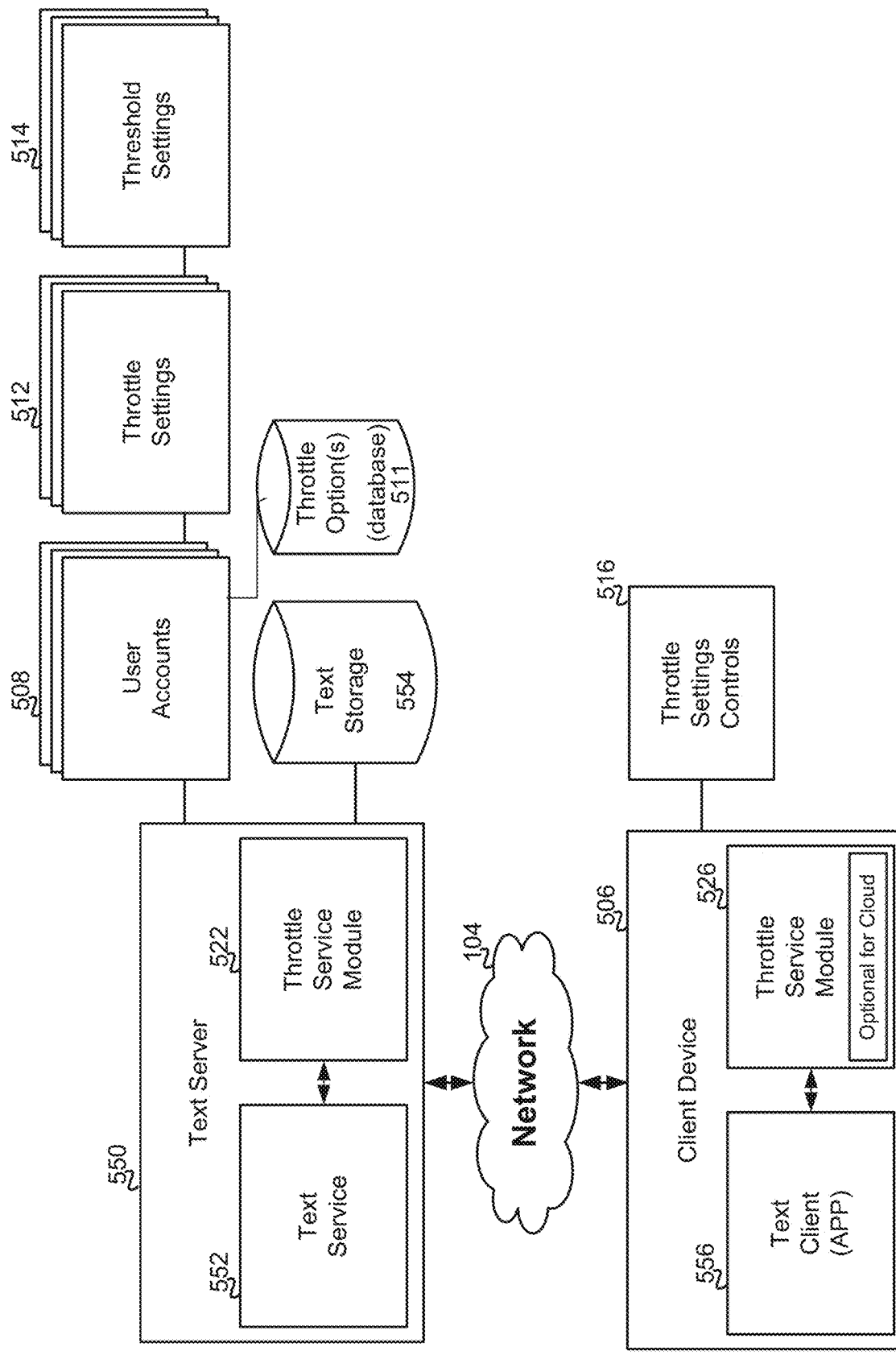
FIG. 5B illustrates an example of a text processing server.

FIG. 5B illustrates an example of a text processing server 550, which processes text service 552. Similar to the email service, the text service 552 is in communication with the throttle service module 1022. Text storage 554 is used to store texts managed by the text service 552. In this example, the client device 506 may also include a text client 556 that is provided with access to throttle service module 526.

Figure 6:
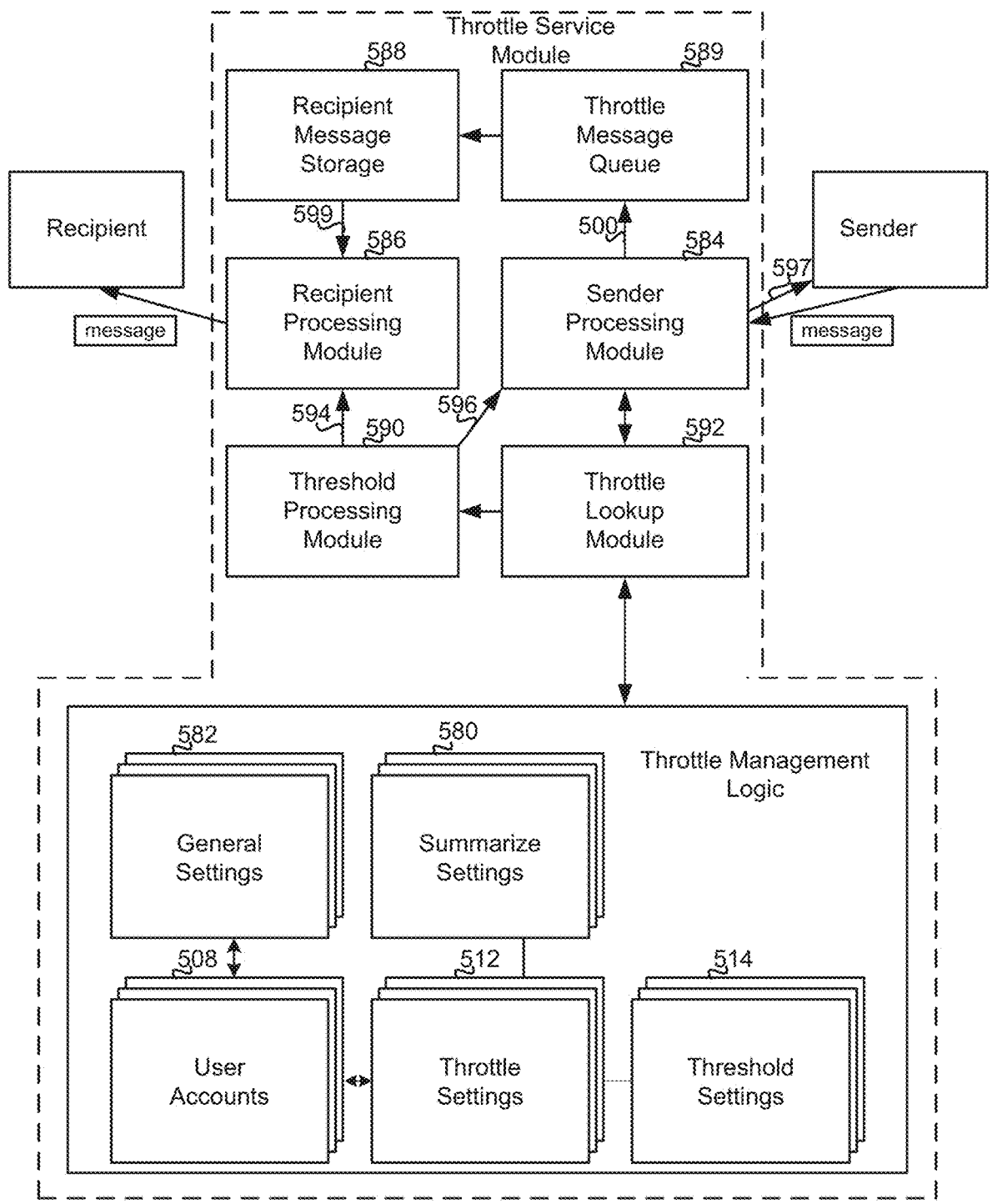
FIG. 6 is an example system diagram of the throttle service module shown in FIG. 5A.
Figure 9:
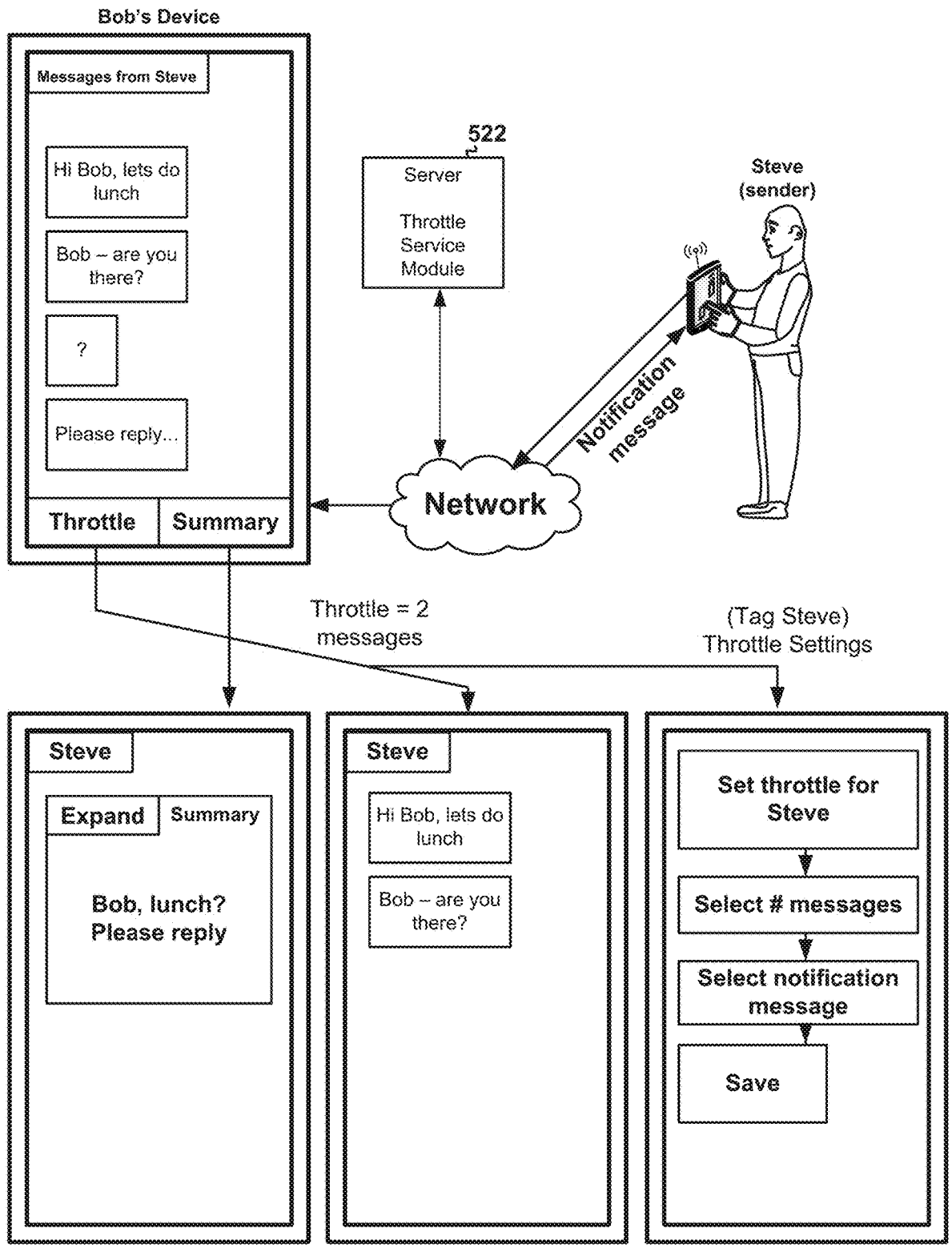
FIG. 9 provides an example of messages being summarized and messages being throttled.
Figure 10:
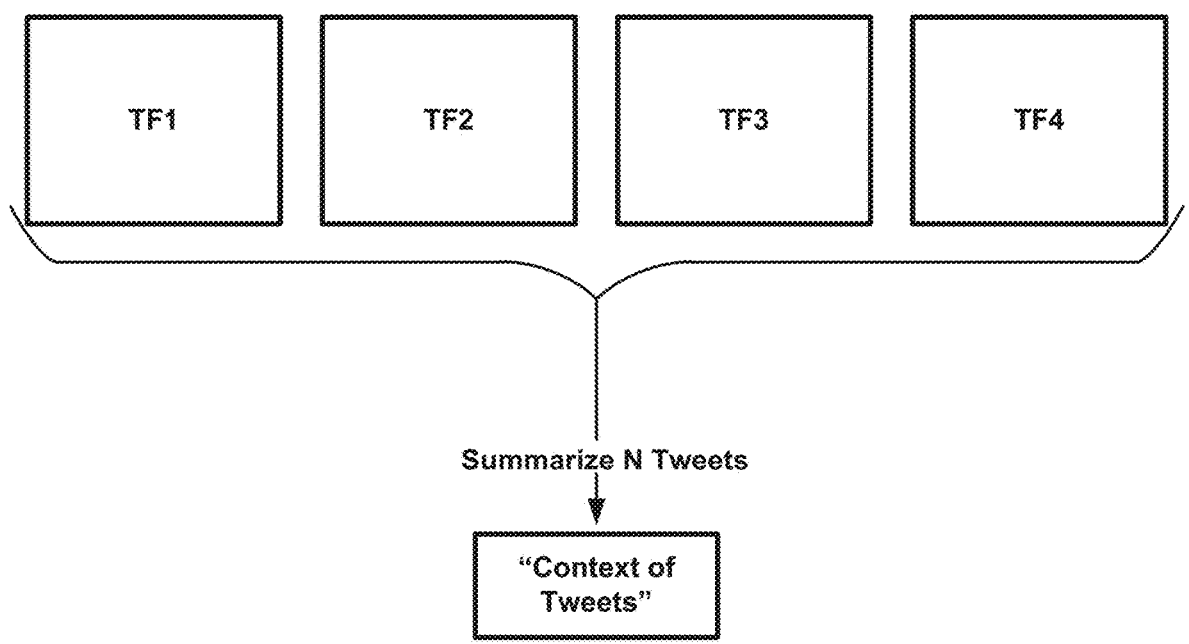
FIG. 10 is a block diagram illustrating an example of a summary feature being applicable to tweets, according to one embodiment.

FIG. 6 is an example system diagram of the throttle service module 522 shown in FIG. 5A. The throttle service module 522 includes a recipient processing module 586 and a sender processing module 584. In operation, a sender may send a message to the recipient, who may be using a system for throttling messages (e.g., email, text, voice, social, tweets, social, etc.). A message sent by sender is received by the sender processing module 584, which is in communication with a throttle lookup module 592. Throttle lookup module 592 is configured to interface with throttle management logic, which provides communication to user accounts 508, the throttle settings 512, the general settings 582, the threshold settings 514, and a summarize setting 582. FIGS. 9 and 10 provide examples of a summarize setting, such as the summarize setting 582, when executed for messages of a user, in accordance with predefined settings.

Based on the throttle settings for the sender and/or the message received, a threshold processing module 590 will process the logic associated with determining if the message should be sent to the recipient, denied, queued, or some other action is to be taken. In one example, signal 596 is sent from threshold processing module 590 to the sender processing module 584, indicating that the message should communicated 598 to the throttle message queue 589 for processing. The processing while the message is at the throttle message queue 589 can include deleting, saving a metadata, and/or saving the message to storage 588. At some later point, the message may be sent 599 to the recipient processing module 586 for processing, e.g., such as forwarding to the recipient. The forwarding would be done at a later time, e.g., after a set period of time has lapsed, after a set number of messages are accumulated, etc. In another example, the threshold processing module 590 may send a message to the recipient processing module 586 to simply send the message direction to the recipient without delay, e.g., as not throttle setting was detected or determined to be needed. As noted above, the processing logic executed by the aforementioned modules can be processed in software, in firmware, in program instructions executed with larger systems or subsystems. In some embodiments, the throttle can also act to capture spam with more fidelity, identify senders of the spam, collect spam messages for showing proof of sender, and automatically throttle certain types of messages, e.g., using learning algorithms.

Figure 7:
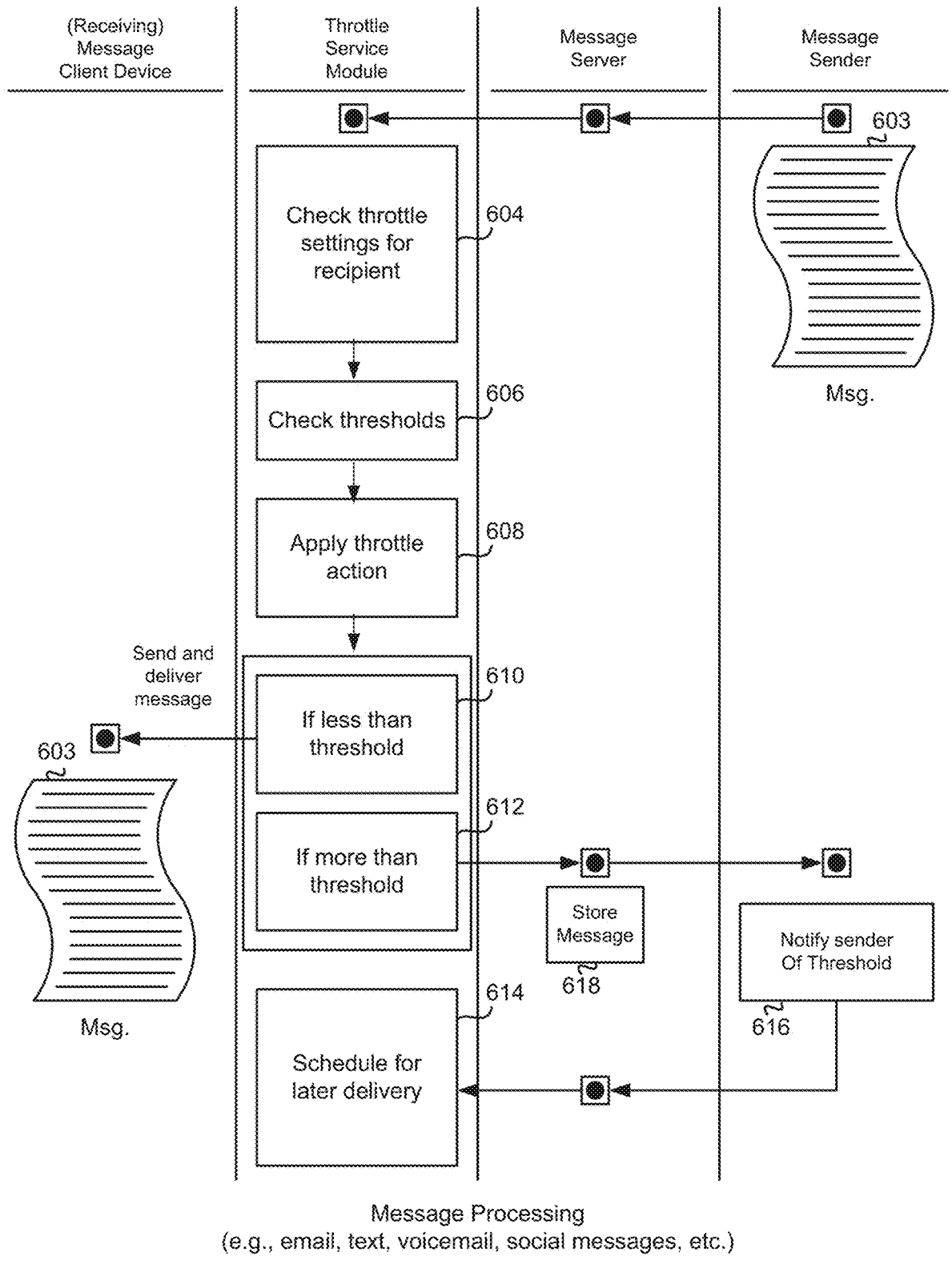
FIG. 7 illustrates an example flow diagram, showing processing by a number of systems.

FIG. 7 illustrates an example flow diagram, showing processing by a number of systems. A client device is shown in communication with a message server (e.g., message server 1102) and a throttle service module (e.g., throttle service module 1022). In this illustration, the throttle service module can cooperate to process a received message 1103. The message 603 is received at a processing node of the message server. At this point, the message and/or metadata of the message is sent to a processing node of the throttle service module. In this example, the throttle service module may check for throttle settings for the recipient in operation 604. In operation 606, the throttle service module 1022 will check for thresholds. Once the thresholds, if any are found and/or instituted, the throttle service module 1022 will apply a throttle action 608. For example, if it is determined that a value (i.e., message number, message time, message frequency, and/or combinations thereof) is less than threshold, then the message 603 is sent to the client device for presentation. If it is determined that the value is more than the threshold, then processing proceeds to the message server node where the message is saved or queued for later delivery (or deleted). In this example, the message is stored 618, and the sender is optionally provided with a notification 616, with a message indicating why the message is throttled (i.e., not being delivered or delayed). In one embodiment, the message is scheduled for later delivery 614 by throttle service module 522. As noted above, the message processing can be for email, text, voicemail, social messages, twitter messages, etc.

Figure 8:
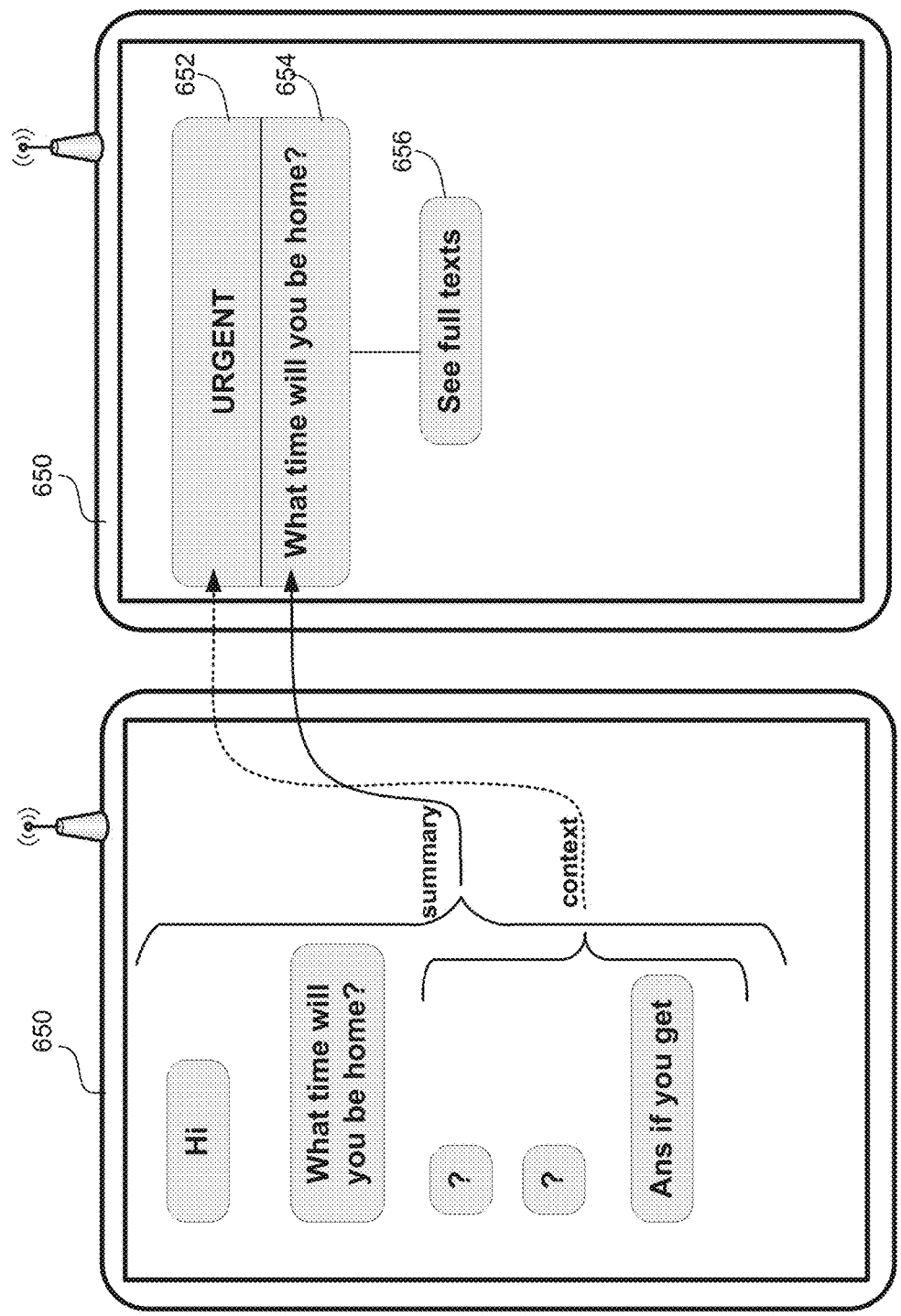
FIG. 8 illustrates an example of a device receiving several text messages from a sender.

FIG. 8 illustrates an example of a device 1050 receiving several text messages from a sender. As shown, the messages may have some context that can be determined, such as the message being urgent. The rest of the message may have a general message theme that is distributed among various short messages. In such as case, the user may select a summary feature or a device may institute the summary feature based on conditions, status, rules, etc., which may act to generate a summary 1054. The system may also deduce that the context is "urgent" and provide a header 652 or some indicator to convey urgency, e.g., such as color, flashing, font size, etc. Although the messages can be condensed to the summary 1054 in the summarize mode, the user may also be provided with the option to see the full texts 656.

FIG. 9 provides an example of messages being summarized and messages being throttled. An example is also provided wherein a user can set throttle settings. The server throttle service module 522 can save the settings made by the various client devices that subscribe to the service. Further shown is a sender "Steve" getting a notification message, e.g., because his message or some messages were throttled (i.e., not delivered or will be delivered later).

For example, user Bob may be receiving multiple short messages from Steve, and these messages may be accumulating. These messages may be small or cryptic or use slang, which could make them difficult to understand without spending too much time scrolling up to obtain enough context to understand what the message is about.

In one example implementation, the summary feature is configured to remove unnecessary messages, identify context based on two or more of the messages, and construct a summary of the messages. In this simple example, the messages are summarized as "Bob, lunch? Please reply." If the user wishes to see the full extent of the messages that resulted in the summary, the user can be provided with the option to expand the messages back out.

If the user Bob wishes to throttle Steve, e.g., because he is getting too many messages from Steve, the user can select to throttle Steve's messages. In one configuration, user Bob may custom configure the settings for Steve, e.g., by setting throttle for Steve. In one example, the setting can be to limit the number of messages that can be received from Steve, since the last read message or over a predefined period of time. Any number can be used, but in this example, the setting was set to 2 messages. In another or additional implementation, the user can also set a notification message custom to Steve. For example, the message can be set to "Steve, please reduce the number of messages being sent, I will get back to you soon," or any other custom or user defined memo. As shown, once the throttle is set to two (2) messages, Bob will only receive two messages from Steve (in real time), and Steve will be notified of the same. This way, if Steve needs to send something important, he will limit his frequency or make more concise text messages, or take some other action.

FIG. 10 is a block diagram illustrating an example of a summary feature being applicable to tweets received over a period of time or for summarizing a subset identified by the user.

Figure 11A:
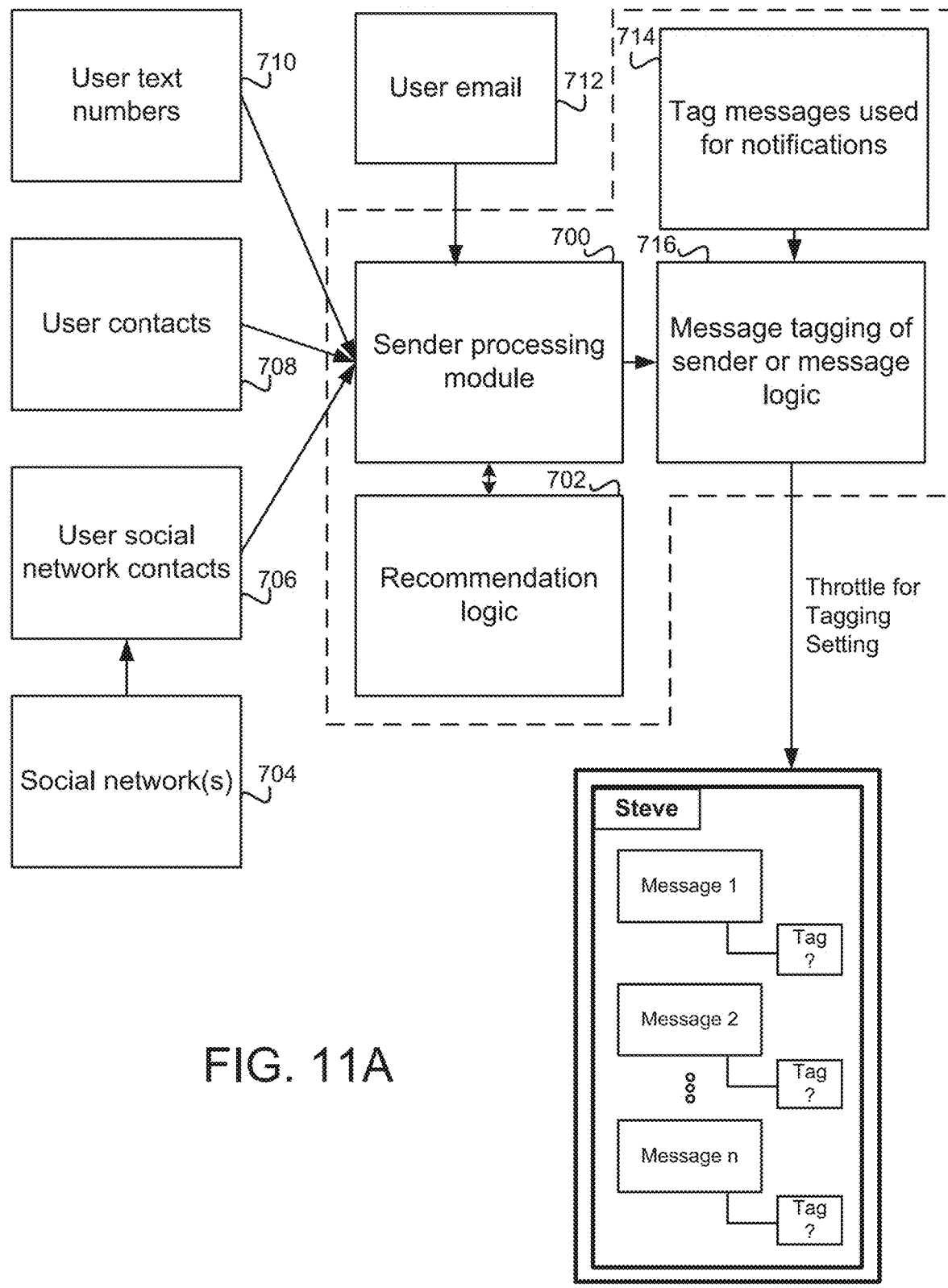

FIG. 11A illustrates an example of a sender processing module 700 (e.g., sender processing module 1086) receiving data or pulling data from various sources so that throttling can be applied. In this example, the sender processing module 700 is in communication with user text numbers 710, user email 712, user contacts 708 (local and/or on online user email/text provider systems), user social network contacts 706 via social networks 704. The sender processing module 700 can be configured interface with recommendation logic 702 for receiving recommendations as to which senders to tag (or mark) for throttling or which senders should be provided different messages. Recommendation logic 702 can also determine a best throttle among many possible throttles based on learned experiences from many users over time. The sender processing module 700 further message tagging of sender or message logic 716. The messages used for notifications 714 will also be used so that when a recommendation to tag a sender for future throttling is made, the message notification is suited for the sender. Thus, it should be understood that in one embodiment different senders can be given different throttling settings and different notification messages. In other embodiments, the system may apply default throttling settings and notification messages based on the activity of the sender with respect to the recipient.

FIG. 11B illustrates an example of assigning action throttles to voice mail, in accordance with one embodiment. As shown, a graphical user interface may be provided on any type of electronic device that receives telephone calls or can access a website to see previously received voicemails associated with a assigned number, such as a telephone number. The assigned number is for a recipient of voicemails, and a plurality of voicemails may be received over time by the recipient. The format shown in FIG. 11B is only by way of example, and other graphical formats, text listings, graphics, may be used to display one or more voicemails received by a recipient over time. In this example, it is shown that the recipient may be receiving voice mail calls from various parties that wish to contact the recipient. In one embodiment, the name of the person leaving the voicemail can be shown, if that person is currently in the recipients address book. If the person leaving the voicemail is not in the recipients address book, the system will simply identify a phone number for the person that called the recipient. In one embodiment, at least part of the voicemail may be transcribed into text. One configuration allows for part of the voicemail to be displayed along with the name or number of the person leaving the voicemail.

In one embodiment, the recipient can apply a throttle action to specific voicemails received from certain persons leaving voicemails. For example, the recipient may have already set an action throttle to voicemails received from mom. In indicator may be shown next to the voicemail to show that an active action throttle is present for the voicemails coming from mom or coming from the phone numbers associated from mom.

In one embodiment, logic processing of received voicemails can occur, which enable the system to identify voicemails coming from a frequent voicemail assigned number or person. When this condition is present, the system may apply a recommendation to the voicemail of that frequent assigned number or person. As shown, John Smith appears to be a frequent caller to the recipient and several voicemails have been left by John Smith. The system can apply a recommendation to add a action throttle for voicemails coming from John Smith. The recommendation can be set to occur once the caller has left X number of voicemails within a Y time frame. By way of example, the X number of voicemails can be more than 2 voicemails, 3 voicemails, 4 voicemails, 5 voicemails, 10 voicemails, or any user configurable number. The Y time frame can also be custom set by the user. For example, the Y time frame can be 1 hour, 2 hours, 3 hours, 1 day, 2 days, 1 month, or any other time interval.

If the recipient (i.e., user) decides to set the action throttle for John Smith, that action throttle will be active for the caller, and any future voicemails left by the caller (during the action throttle) will be automatically responded by the system with a message to the caller. The message will notify the caller that messages will not be delivered or read from the caller until a period of time has passed. In another embodiment, the caller can be notified that they have called more than 5 times within the last hour, and the recipient will return their call soon but no more voicemails can be left by the caller. Providing active notification to the caller that no more voicemails will be supported from that caller enables a reduction of voicemails to be processed by the system, which makes it more efficient for the recipient to handle the voicemails and also for the system to provide processing power to other calling persons wishing to leave voicemails.

This embodiment has illustrated an example where voicemails can be throttled by a user, such that frequent callers or callers with an excess number of voicemails can be throttled. Further, notifications can be sent or messages can be played to the frequent caller notifying them that their voicemails are being throttled. The notifications or messages can be customized by the user, such as by leaving customized voicemail responses, text messages, etc. to throttled users. By way of example, if the user decided the throttle voicemails from mom, the user can record a customized recording that will be the message sent back to mom when she exceeds her limit of voicemails and/or is being throttled.

A summary of the voicemails could also be provided. The voicemail summary could be used to replace a plurality of prior voicemails that have not yet been read by the recipient. For example, in the example shown in FIG. 11B, John Smith can be given the opportunity to provide a summary voicemail in any of a variety of ways, such as those noted above. An interaction with the caller can be used to enable the caller to provide a custom summary message or selection of one or more of the previously left voicemails to be consolidated (or concatenated) for a summary.

FIGS. 12A-12G are illustrations of a graphical user interface 1200 used to present text messages to a recipient according to one embodiment. The graphical user interfaces are shown from the position of a sender of text messages to the recipient. The graphical user interface 1200 is displayed on a display device associated with a computing device.

Figure 12A:
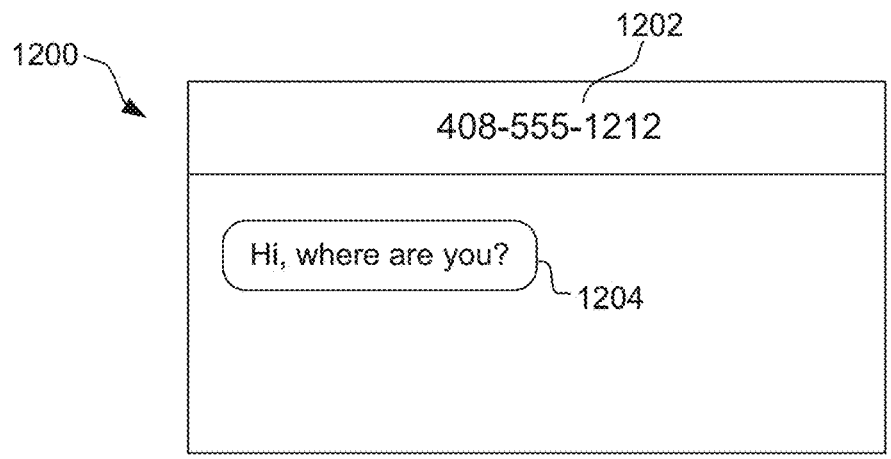
FIGS. 12A-12G are illustrations of a graphical user interface used to present text messages to a recipient according to one embodiment.
Figure 12B:
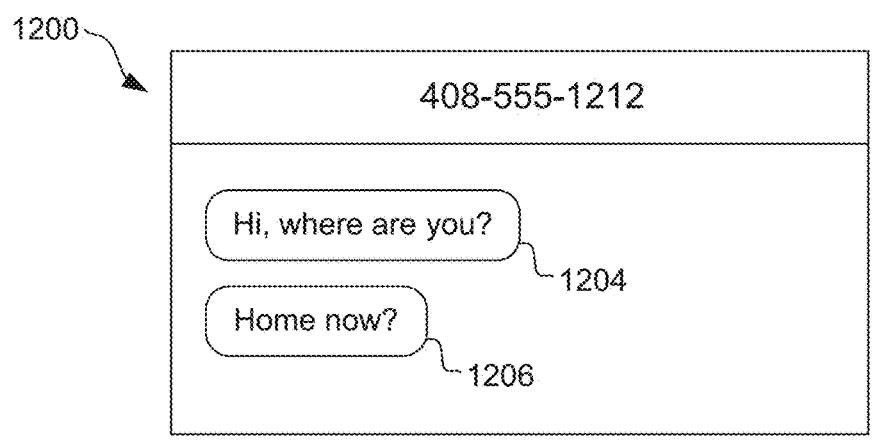
Figure 12C:
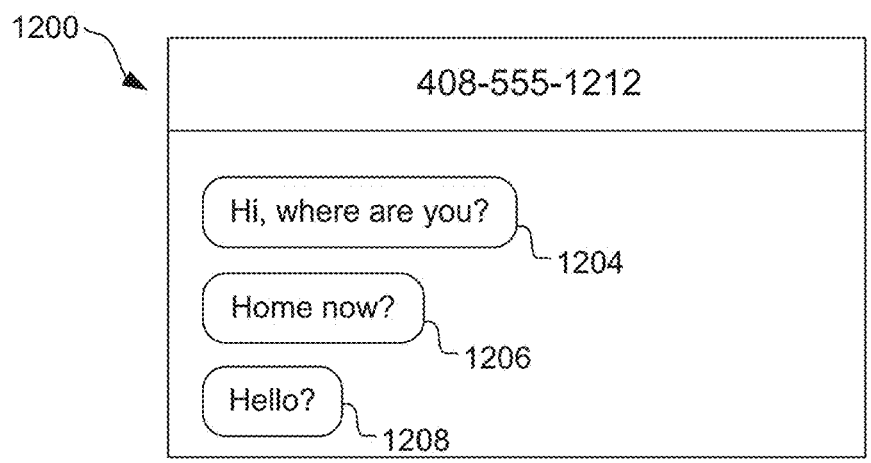
Figure 12D:
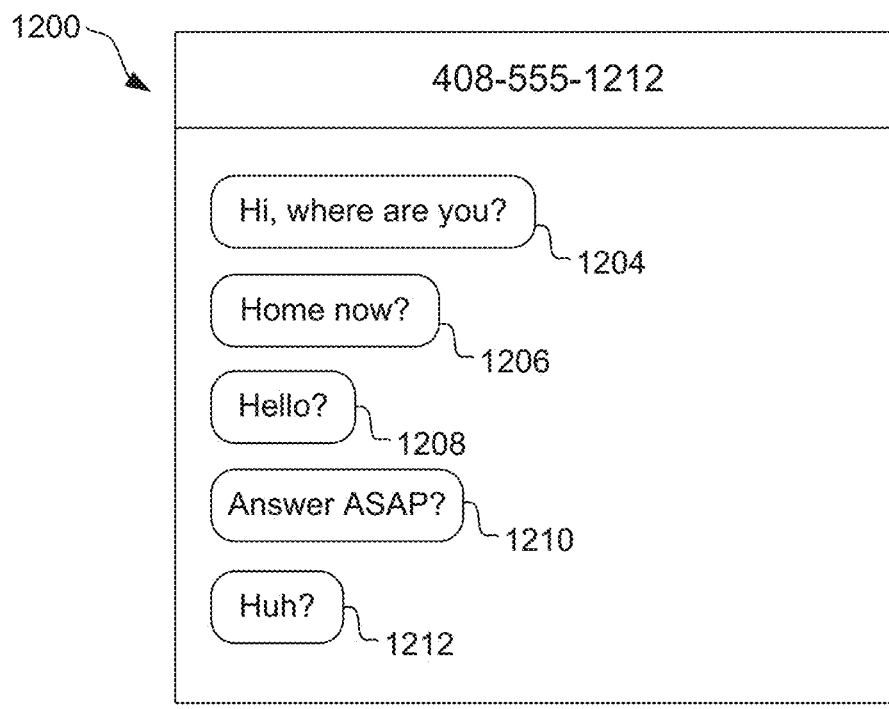
Figure 12E:
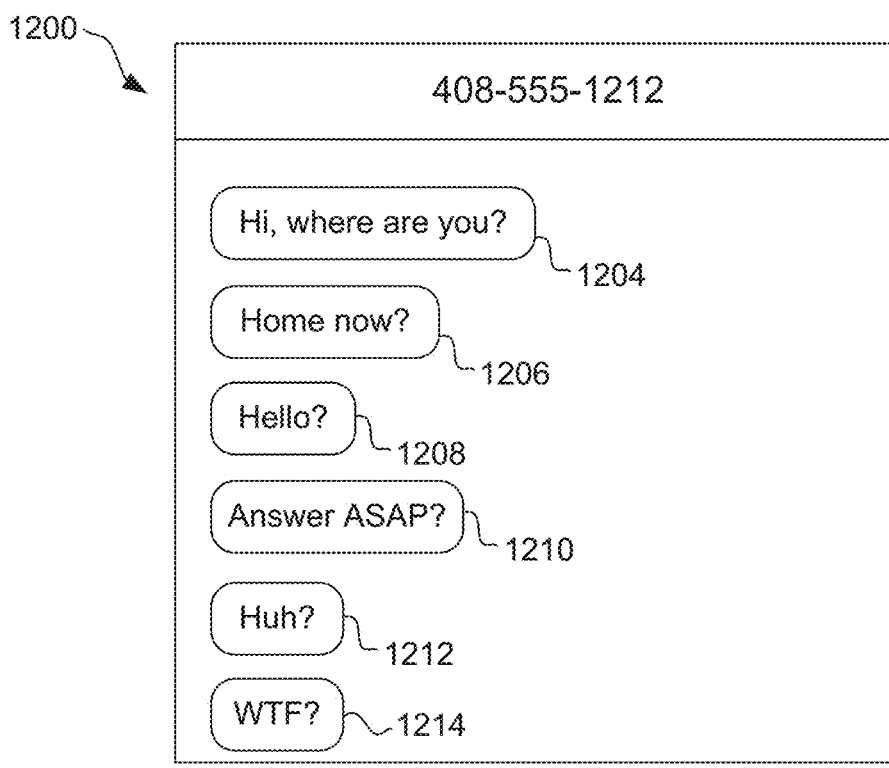

In FIG. 12A, the graphical user interface 1200 illustrates a first message 1204 being received and presented. The first message 1204 is from the sender and is to the recipient, whom is identified by recipient information 1202. In FIG. 12B, the graphical user interface 1200 is updated to present a second message 1206 that has been sent from the sender to the recipient. In FIG. 12C, the graphical user interface 1200 is updated to present a third message 1208 that has been sent from the sender to the recipient. In FIG. 12D, the graphical user interface 1200 is updated to present a fourth message 1210 and a fifth message 1212. In FIG. 12E, the graphical user interface 1200 is updated present a sixth message 1214. Hence, FIGS. 12A-12E show an exemplary series of screens that are sequentially provided by the graphical user interface 1200 as the sender enters a series of messages.

Figure 12F:
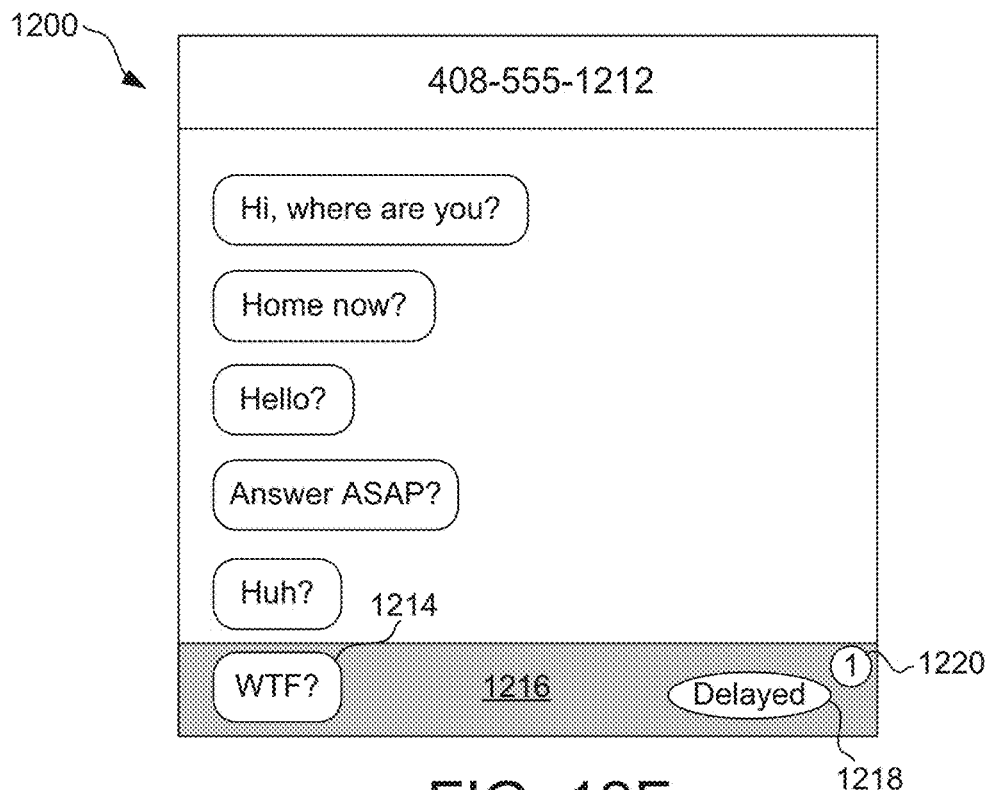

In FIG. 12F, the graphical user interface 1200 can then be updated to indicate that the sixth message 214 is being throttled. In the particular exemplary embodiment shown in FIG. 12F, the sixth message 1214 is shown in a visually distinct manner 1216. For example, the visual distinctness can be shown by the sixth message 1214 being highlighted or grayed-out. Also, the graphical user interface 1200 can display a delayed symbol 1218 (e.g., text and/or graphics), which can signify that the corresponding message (i.e., the sixth message) has been delayed, i.e., throttled. Furthermore, if desired, the graphical user interface 1200 can also indicate a numeric indicator 1220 that signifies the number of messages that are delayed, i.e., throttled.

Figure 12G:
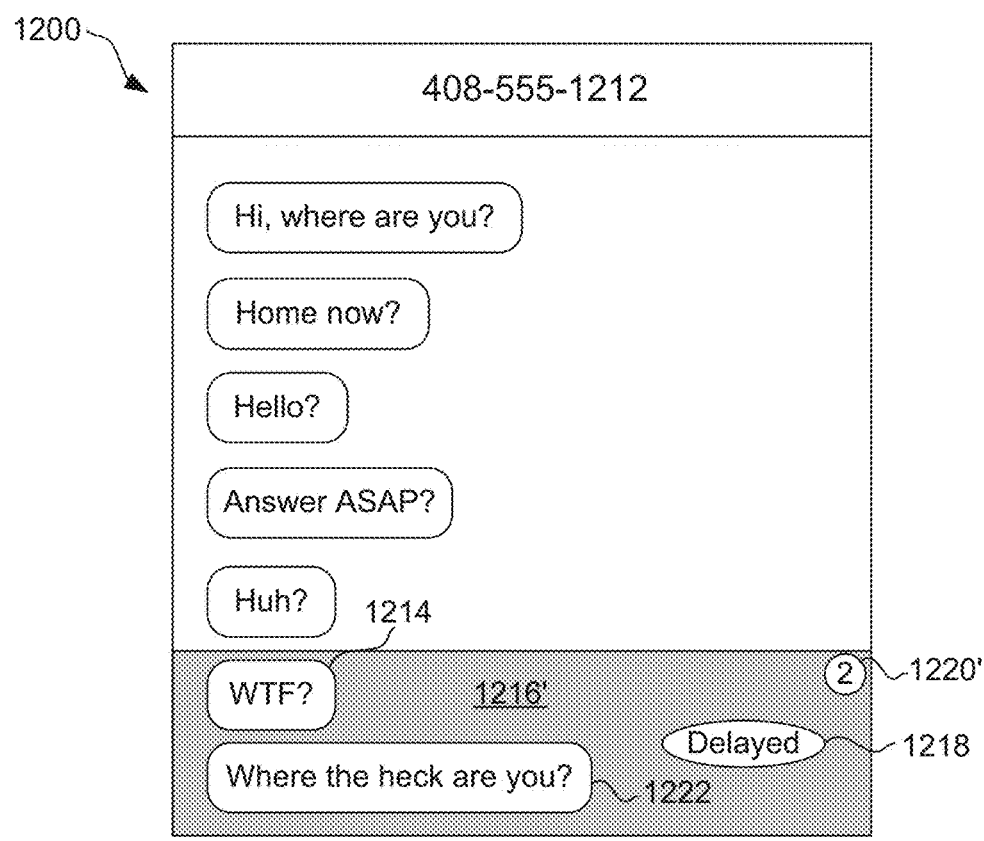

In FIG. 12G, the graphical user interface 1200 can then be further updated when the sender sends another message, namely, a seventh message 1222, to the recipient. Since the sender is already being throttled, the seventh message 1222 is also throttled. In the particular exemplary embodiment shown in FIG. 12G, the sixth message 1214 and the seventh message 1222 are shown in the visually distinct manner 1216' since both message are throttled. Also, the graphical user interface 1200 can display the delayed symbol 1218 (e.g., text and/or graphics) proximate to the sixth message 1215 and the seventh message 1222, which signifies that the corresponding messages have been delayed, i.e., throttled. Furthermore, if desired, the graphical user interface 1200 can also indicate the numeric indicator 1220' that signifies the number of messages that are delayed, i.e., throttled. At this point, in this particular example, there are two messages being throttled, so the numeric indicator 1220' can indicate a "2".

As another example, a graphical user interface can display an indication that denotes a remaining duration of throttling of messages. For example, the remaining duration can be displayed to a sender with a notification such as "Throttling Time Remaining: 3 minutes." The remaining duration can be the duration until a next message can be sent (e.g., next throttled message) or the duration until throttling is turned-off or cleared.

In another embodiment, if a user is throttled, the system can be configured to support an override or emergency message or perhaps a "free pass" message. For example, the sender can be given the ability to provide such an additional message which might be useful in certain situations. In one embodiment, a sender may be able to override a throttle condition. The system can detect an override condition of some sort of. A private word or code is one example of a means to invoke an override condition. If there is any indication of such party conditions, in one embodiment, the recipient can be delivered one or more additional messages and can, if so configured, be alerted by special ring or notice.

In still another embodiment, a recipient can have the ability to change a throttle threshold for the sender in near real time. For example, a graphical user interface can be displayed for the recipient that includes a user interface control that allows the recipient to increase the threshold throttle for the sender. The increased threshold can be then used for the current message session or can become the default threshold for the sender. Also, the sender who has been notified that they have been throttled can in one embodiment be able to request that the recipient increase the threshold throttle being imposed. For example, if the sender has been throttled after having sent five messages that remain unread, the sender can request that the recipient be permitted to send a sixth message that will not be throttled. In this example, the sender is then likely to send a final "to the point" message to the recipient since it is likely their last message for some period of time (at least while the throttle remains imposed).

In another embodiment, a sender may be able to override a throttle condition. The system can detect an override condition of some sort of. A private word or code is one example of a means to invoke an override condition. If there is any indication of such party conditions, in one embodiment, the recipient can be delivered one or more additional messages and can, if so configured, be alerted by special ring or notice.

Figure 13A:
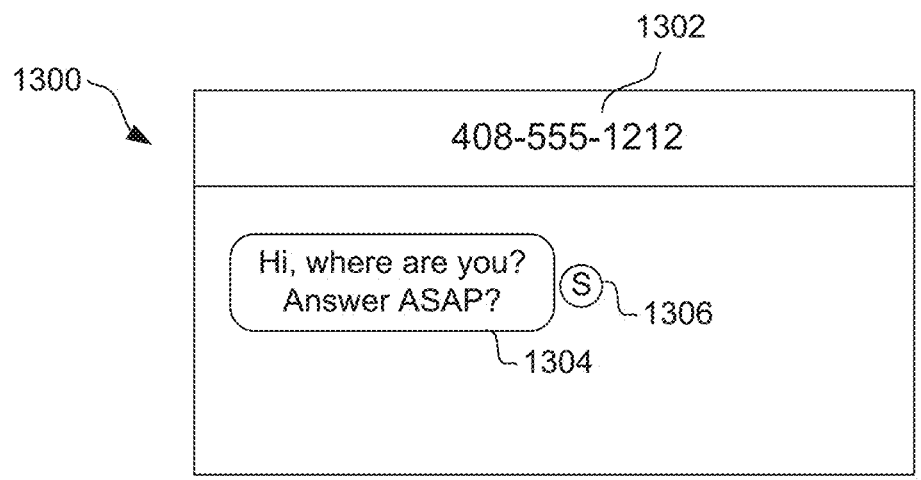
FIGS. 13A-13B are illustrations of a graphical user interface used to present a summary message to a recipient according to one embodiment.
Figure 13B:
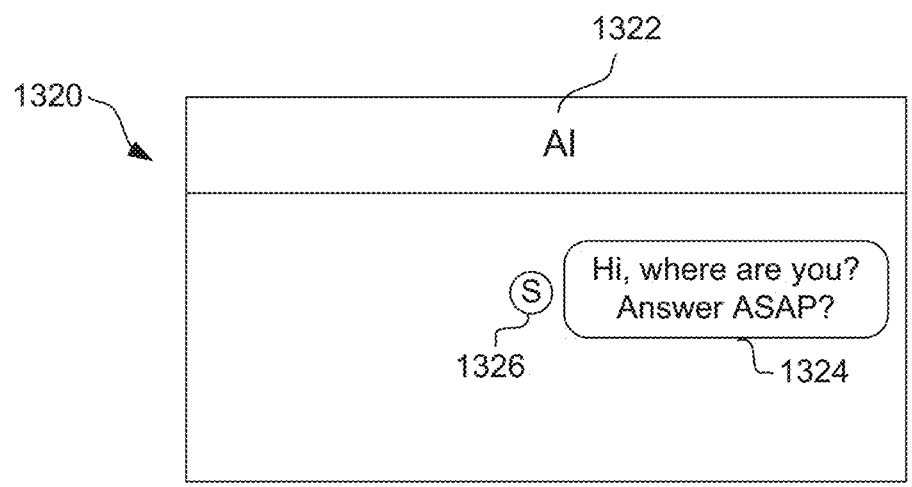

FIGS. 13A-13B are illustrations of a graphical user interface used to present a summary message to a recipient according to one embodiment.

FIG. 13A shows a graphical user interface 1300 from the position of a sender of messages (e.g., text messages) to a recipient. The graphical user interface 1300 is displayed on a display device associated with a computing device of the sender. The graphical user interface 1300 can indicate the recipient, whom is identified by recipient information 1302. The graphical user interface 1300 also includes a summary message 1304. The summary message 1304 can be produced using any of the techniques noted above. The graphical user interface 1300 can also include a summary symbol 1306 (e.g., text and/or graphics), which can serve to signify that the corresponding message is a summary message. Further, in one embodiment, if the summary symbol 1306 is a user interface control and if selected by a user of the computing device presenting the graphical user interface 1300, then the summary message 1304 can be replaced or reverted to its original messages. For example, the summary message 1304 can represent the series of six messages show in FIG. 6E, and thus if the summary symbol 1306 is selected then the summary message 1304 can be removed and replaced by the six messages such as shown in FIG. 6E.

FIG. 13B illustrates of a graphical user interface 1320 from the position of a recipient of messages (e.g., text messages) from a sender. Since the messages are being exchanged between sender and receiver, the messages in FIGS. 13A and 13B are the same. The graphical user interface 1320 is displayed on a display device associated with a computing device of the recipient. The graphical user interface 1320 can indicate the sender, whom is identified by sender information 1322. In this example, the sender information 1322 indicates the senders name "Al." The graphical user interface 1320 also includes a summary message 1324. The summary message 1324 can be produced using any of the techniques noted above. In this example, the summary message 1324 is the same as the summary message 1304 shown in FIG. 13A. The graphical user interface 1320 can also include a summary symbol 1326 (e.g., text and/or graphics), which signifies that the corresponding message is a summary message. Further, in one embodiment, if the summary symbol 1326 is a user interface control and if selected by a user of the computing device presenting the graphical user interface 1320, then the summary message 1324 can be replaced or reverted to its original messages. For example, the summary message 1324 can represent the series of six messages show in FIG. 6E, and thus if the summary symbol 1326 is selected then the summary message 1324 can be removed and replaced by the six messages such as shown in FIG. 6E.

Notably, in another embodiment, the graphical user interface 1320 does not include any indication that the message display is a summary message. In such case, the recipient does not have any indication that the message displayed in a summary message. For example, the summary symbol 1326 would not be included in the graphical user interface 1320 in such embodiment. This embodiment thus permits a sender of a series of messages to exchange them for a summary message, which facilitates more concise and desired communications, particularly when the original messages were not promptly read (viewed) by recipient.

Figure 14A:
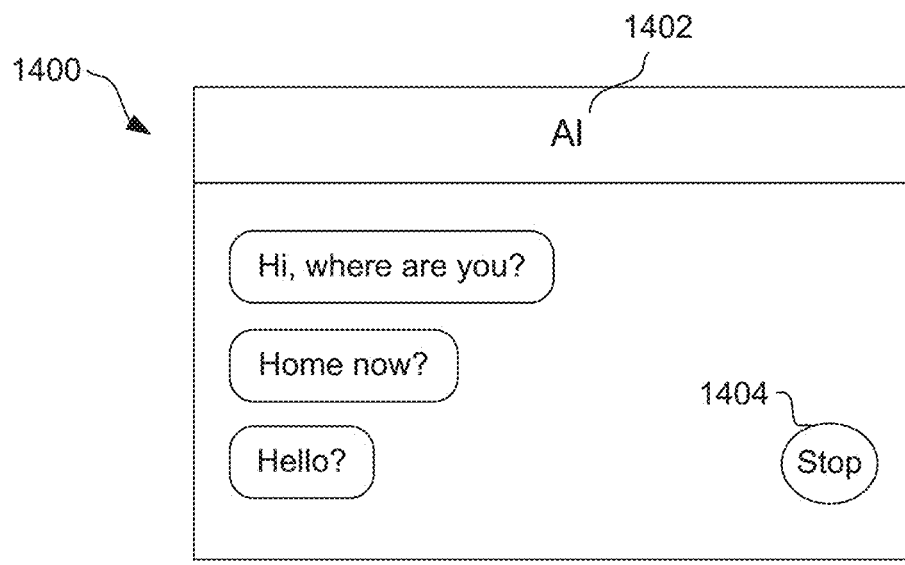
FIGS. 14A-14B are illustrations of a graphical user interface used to implement a busy condition by a recipient according to one embodiment.
Figure 14B:
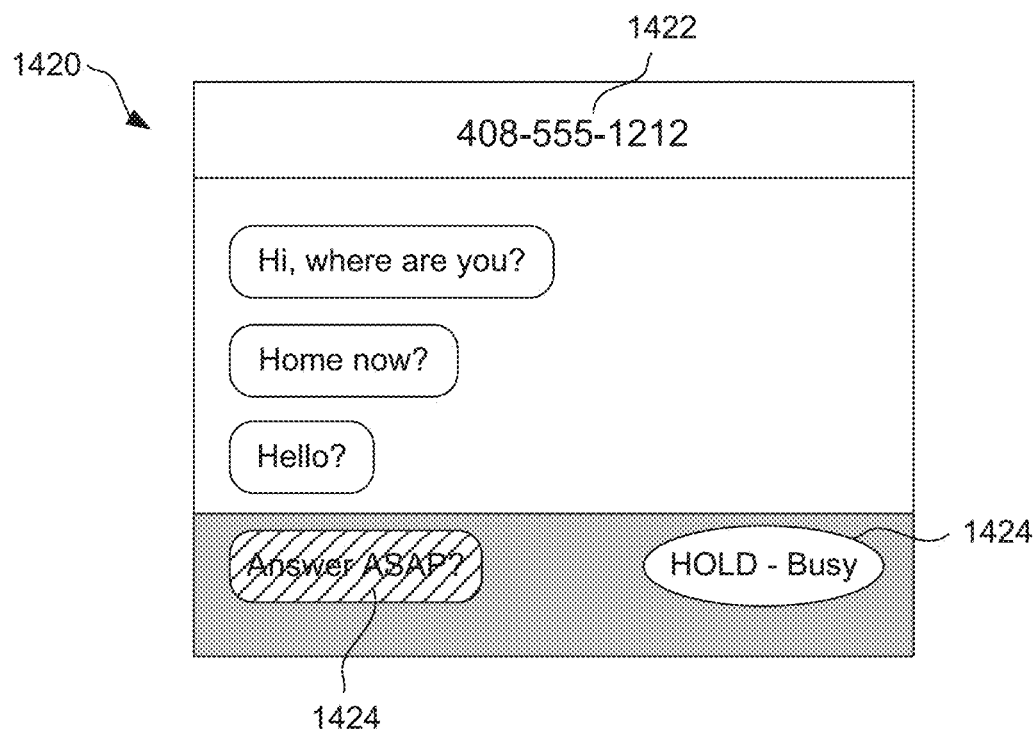

FIGS. 14A-14B are illustrations of a graphical user interface used to implement a busy condition by a recipient according to one embodiment.

FIG. 14A illustrates of a graphical user interface 1400 from the position of a recipient of messages (e.g., text messages) from a sender. Since the messages are being exchanged between sender and receiver, the messages in FIGS. 13A and 13B are the same (unless blocked). The graphical user interface 1400 is displayed on a display device associated with a computing device of the recipient. The graphical user interface 1400 can indicate the sender, whom is identified by sender information 1402. The graphical user interface 1400 can also include a stop symbol 1404 (e.g., text and/or graphics). In one embodiment, if the stop symbol 1404 is a user interface control and if selected by a user of the computing device presenting the graphical user interface 1400, then a busy status can be set. The bust status can signify that the user does not presently want to receive additional messages from the sender. The stop symbol 1404 can visually indicate whether the busy status is active or inactive.

FIG. 14B shows a graphical user interface 1420 from the position of a sender of messages (e.g., text messages) to a recipient. The graphical user interface 1420 is displayed on a display device associated with a computing device of the sender. The graphical user interface 1420 can indicate the recipient, whom is identified by recipient information 1422. The graphical user interface 1420 can display a busy symbol 1424 (e.g., text and/or graphics), which can signify that the corresponding message (i.e., the fourth message) has been held, i.e., not provided to recipient, because the recipient has a busy status. In the particular exemplary embodiment shown in FIG. 14B, the fourth message is shown in a visually distinct manner 1426. For example, the visual distinctness can be shown by the fourth message 1424 being highlighted or grayed-out. After the busy status of the recipient ends, the fourth message can then be automatically provided to the recipient, or can be enabled for sending by the sender. The hold processing can be implemented by corresponding sender or recipient client applications and/or a remote server system.

FIGS. 15A-15D are exemplary database tables provided in a database that supports throttling of messages and/or providing summary messages. These exemplary database tables are just one representation of a database organization, and thus should not be considered limiting.

FIG. 15A illustrates a sender table 1500 according to one embodiment. The sender table 1500 includes information pertaining to a particular sender. As shown in FIG. 15A, one sender that sends messages to the recipient is "Al." According to the sender table 1500, for the sender Al, throttle is enabled, and summary is enabled. Hence, with respect to Al, the recipient and/or the system has designated that messages received from Al will be subjected to a throttle action, and/or a summary action if the associated criteria is met.

FIG. 15B illustrates a throttle table 1502 according to one embodiment. The throttle table 1502 can, for example, provide data pertaining to a throttle action. As illustrated in FIG. 15B, for the sender Al, the throttle table 1502 indicates that a threshold to be utilized to initiate a throttle action is five (5) messages. The throttle table 1502 can also indicate a count of the number of currently unread messages from the sender Al. As an example, the throttle table 1502 can pertain to the display screen shown in FIG. 6G in which there are seven (7) unread messages, two (2) of which have been throttled because they are beyond threshold of five (5).

FIG. 15C illustrates a summary table 1504 according to one embodiment. The summary table 1504 can, for example, provide a threshold, and a summary message ID associated with a given sender. In the example illustrated in FIG. 15C, the sender Al has a threshold of five (5) and a summary message identifier is "S101." There can be more than one summary message for a sender. The different summary message can be for different time periods, such as daily, hourly, etc.

FIG. 15D illustrates a message table 1506 according to one embodiment. The message table 1506 can, for example, contain information pertaining to messages destined for the recipient. In this example, the message table 1506 associates a sender of a message with status and content information for the message. In particular, the message table 1506 identifies a sender, a message identifier, a timestamp for the message, a read indicator (indicating whether or not the message has been read), a summary message set (indicating those underlying messages that are summarized by a summary message), and content of the message itself. In the example illustrated in FIG. 15D, there are six (6) original messages received by recipient from sender Al in a relatively close timeframe. Since Al has a summary threshold of five (5) associated therewith, the number of unread messages for the recipient from Al, has exceeded the threshold. Hence, a summary message is generated and is identified by message identifier "S101" and serves to replace the underlying messages M1 through M6 as denoted by the summary message set. Further, the summary message is contained with n the message table 1506.

Various techniques can be used to determine whether a user has read (or viewed) incoming messages. As one example, if the user (i.e., recipient) has the message application open and has interacted with (e.g., scrolled) the graphical user interface, then the messages displayed therein can be considered to have been read. As another example, the recipient's computing device can include an accelerometer and using such data can estimate if following a delivery notification whether the user has likely moved the recipient's computing device to read the message. As another example, if a recipient subsequently sends a reply message it can be assumed that all prior messages that have been previously displayed have been read. However, there can be a delay, so in one implementation a short delay (e.g., 5 seconds) can be used in case the incoming message and a reply "cross" in the network. Then, a message is considered read if was displayed for at least the short delay duration prior to the reply.

If summary message is used, the earlier messages being summarized can also be removed and no longer presentable, or can be available to recipient, sender or both, through a user action (e.g., selection of a user interface control) to request the original corresponding messages. In one embodiment, as messages are received from a sender, a recipient can be provided the opportunity to associate the sender with a tag. The tag can correspond to a category or grouping for senders. Examples of tags include family, friends, work associates, telemarketers, collectors, etc. One advantage of using tags is that upon tagging a sender, the message management with respect to the sender can be configured in accordance with the characteristics established for the tag. As a result, the recipient is able to easily configure settings to be utilized with respect to message management.

In some embodiments, throttle actions can be invoked without specific user input (from a recipient). In other embodiments, a graphical user interface can be presented to enable a user to initiate certain actions. As one example, a graphical user interface control can be presented on the graphical user interface that also presents the messages. One example of a control is a busy control that would enable the recipient to set his condition as "busy." Another example of a control is a throttle control that would enable a user to manually invoke a throttle action against the sender. Still another example of a control is a tag control that would enable a user to set a tag or a given sender.

Figure 16:
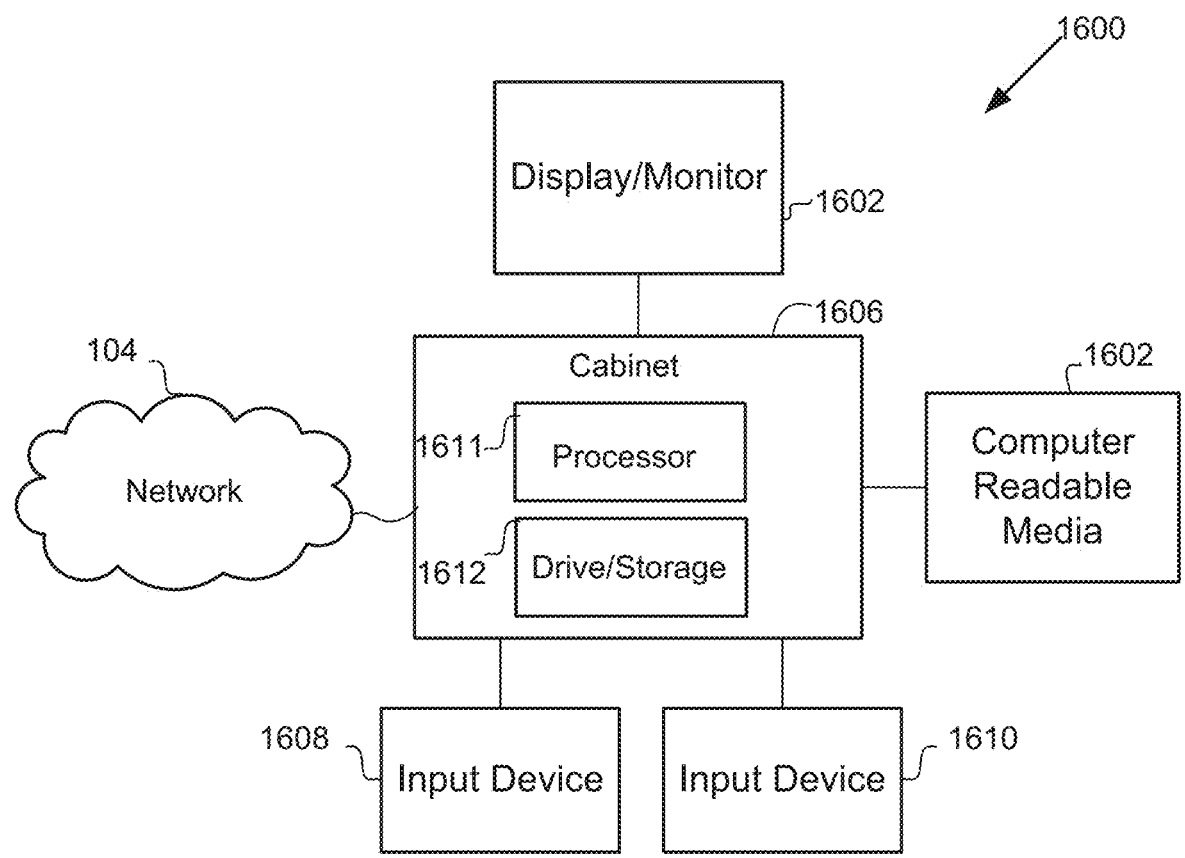
FIG. 16 shows an exemplary computer system.

FIG. 16 shows an exemplary computer system. One or more of the exemplary computer systems are suitable for use with at least one embodiment of the invention. The computer system 1600 includes a display/monitor 1602 having a single or multi-screen display, touch screen, (or multiple displays), a cabinet 1606, an input device 1608 (e.g., keyboard), input device 1610 (e.g., a mouse, input surface, buttons, speakers, controller, etc. The cabinet 1606 houses the computer system. The cabinet 1606 can, for example, be the casing of a smart phone, a laptop, a tablet, a desktop, etc. The cabinet 1606 can also house drive(s)/storage 1612 (e.g., such as a CD-ROM, system memory, and a mass storage device (e.g., hard drive or solid-state drive), etc.), which may be utilized to store retrievable software programs incorporating computer code that implements an embodiment of the invention, data for use with embodiment(s) of the invention, and the like. Other exemplary computer readable medium may include computer readable digital video, audio, including floppy disk, tape, flash memory, system memory, and hard drive may be utilized. The cabinet 1606 may also house a processor 1611, which is used to process operations for carrying out one or more operations described herein. The processor can also enable communication of data with a network 104. The network may be, for example, a local area network, a wide area network, or the Internet.

Figure 17:
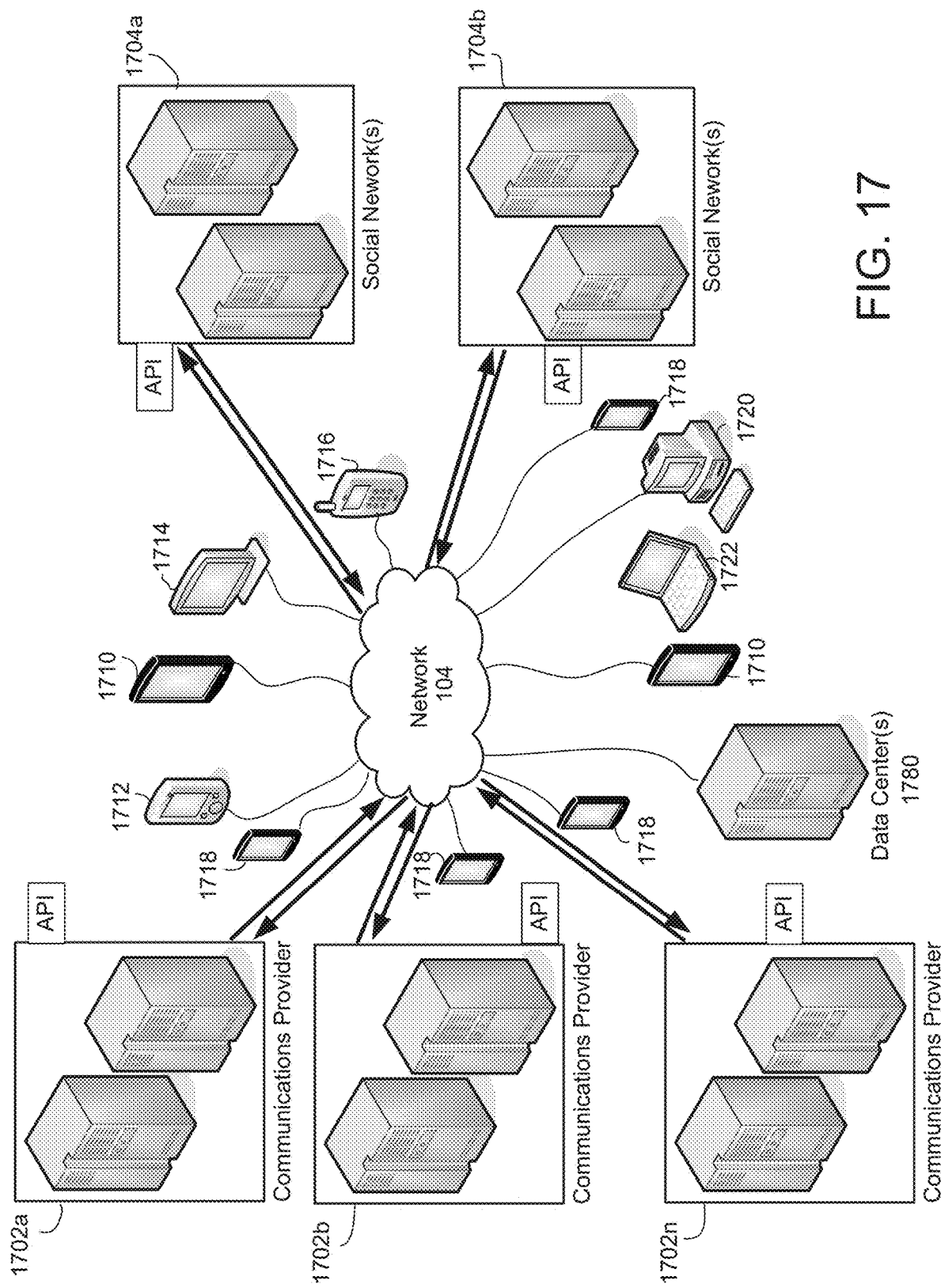
FIG. 17 illustrates one example of a connected network of devices and systems utilized for facilitating aspects of the disclosed embodiments.

FIG. 17 illustrates one example of a connected network of devices and systems utilized for facilitating aspects of the disclosed embodiments. A network 104, as described above, may include many types of networks, including local area networks, wide area networks, and connections to the Internet. The network 104 is utilized by computing devices to access communication providers 1702a-1702n, depending on their service provider carrier and/or the service provider carrier of the recipient of messages. Many times, messages between devices will interact with different communication providers 1702, depending on the recipient and the sender. The network 104 may also be used to provide connection to social networks 1704a-1704b, which may be utilized to identify social connections of particular users. Interconnections between individual devices, communication providers, and social networks may utilize one or more Application Programming Interfaces (APIs), which are defined for exchanging data in specific formats. The specific format in which data is exchanged between the social networks 1704, the communication providers 1702, and the devices requires that the data be structured so that requested data can be obtained from data sources within the systems and exchanged back in an efficient manner. The efficient communication of data among larger systems helps reduce lag time, and ensures for more real-time delivery of data that is requested by specific systems, or by individual devices. By way of example, the devices that may communicate with the network 104 are many, and in reality the types of devices are continuing to grow.

The example devices communicating with the network 104 include personal digital assistant devices 1712, tablet computers 1710, display devices 1714, telephone devices 1716, smart phone devices 1718, desktop computers 1720, laptop computers 1722, and other types of computing devices. These devices can be used to generate messages, receive messages, communicate or instruct the messages to be sent to another user, or respond to messages. The throttling mechanisms and summary mechanisms described above can also be set by anyone of the example devices. When a throttle operation is performed or instructed to be performed by one of the devices, the instruction data goes to network 104. The message or data is then propagated to or through one or more communication providers 1702. In addition to the communication providers 1702, various other types of networking equipment, such as routers, hubs, switches, data centers 1780, servers, etc., may interact with the data being sent or received. Logic operations can be performed by custom business logic of the communication providers 1702, depending on a user's service level, they are configuration, applications being run, etc. In some instances, applications that provide for throttling or summary generation may be executed at least in part by servers of one or more of the communication providers 1702. In another embodiment, servers in separate cloud computing environments, e.g., data centers 1780 distributed throughout a geographic area, can be used to apply logic for completing the desired throttling or summary generation. Some of these operations may utilize one or more of the systems in cloud servers, data centers 1780, or infrastructure of the communication providers to communicate with the social networks 1704. The social network 1704 may provide information regarding users social graph, friends lists, recent interactions with friends, identification information regarding friends, identification information regarding users that are not yet friends, identification of related users to senders and recipients of messages, and other metrics. This information can be gathered from time to time by cloud systems that operate or enable the throttling operations and summary operations. The cloud systems, in one embodiment, are executed by servers that may be housed in one or more data centers. In other embodiments, the cloud systems may be housed in enterprise locations or integrated with one or more locations of a communications provider 1702. Depending on the communication or data requested from the social networks 1704 or other data collection systems, APIs may be access so that data can be efficiently requested and received in accordance with a standard protocol or structure.

Additionally, communications systems may also be configured with special purpose circuitry that makes processing of messages more efficient. The special purpose circuitry may include network interface cards that can receive large volumes of messages from a multitude of users, and enable efficient exchange of data between other users that may be part of the same communications provider or other communications provider. In some embodiments, backbone systems are utilized by the communications providers to make efficient transfer of messages, routing of messages, delivery of messages, queuing of messages and saving of messages in a large scale. These systems can be constructed from a multilayered hardware and software components. These components can include proprietary routing and handling algorithms within server systems or data centers and can extend to general data handling once the data is communicated over the network 104.

In one example, the communication providers 1702 may define a public switched telephone network (PSTN). A PSTN is the aggregate of circuit-switched telephone networks that are operated by national, regional, or local telephony operators, providing infrastructure and services for public telecommunication. A PSTN consists of telephone lines, fiber optic cables, microwave transmission links, cellular networks, communications satellites, and undersea telephone cables, all interconnected by switching centers, thus allowing most telephones to communicate with each other. These networks include mobile networks, as well as fixed telephones.

Broadly speaking, mobile phones, e.g., smart phones, send and receive radio signals with any number of cell site base stations having microwave antennas. These cell sites may be connected to a tower, pole or building, located throughout populated areas, then connected to a cabled communication network and switching system. Mobile phones have a low-power transceiver that transmits voice and data to the nearest cell sites, normally not more than 8 to 13 km (approximately 5 to 8 miles) away. These are simply examples systems, infrastructure, hardware, and circuitry that facilitate communication of messages between devices and users. Messages communicated using these devices, hardware, and infrastructure can assist in implementing the throttling or summary functions described herein.

In addition to the devices illustrated in FIG. 17, Internet of things (IOT) devices also continue to expand in their functionality, such as data collection using various sensors. This data can be gathered by the communication providers 1702, social networks 1704 or enterprise systems that communicate with the network 104. These IOT devices can therefore produce data that can be used or communicated by messages. These messages produced by IOT devices can also be throttled or summary processed, depending on their context or use.

It should be understood that the various implementations described herein defined technical operations there are more than just processing general operations. These technical operations provide benefits associated with efficient processing power, reduction of power usage caused by excessive messaging, and also lowers the demand on the message handling infrastructure. Furthermore, data exchanged by the various systems can be structured to make efficient communication possible, e.g., by utilization of Application Programming Interfaces (APIs). Structured data reduces processing inefficiencies, and improves the speed at which messages can be communicated, throttling operations can be performed, and summary operations generated, depending on the demands or requests made by specific devices utilizing features described herein.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A cloud system for servicing message exchanges between users that operate as senders and recipients of messages, the cloud system comprising:
 a server interfaced with storage, the storage used to store messages being exchanged by the users, the users being provided with access to the cloud system via user accounts managed by the cloud system, the user accounts enabling the users to send and receive messages, the server operates to receive the messages from one or more senders and to cause the messages to be sent to one or more recipients,
 the server includes throttle logic that enables the users to configure and apply throttle settings on the one or more senders that send the messages,
 for a particular sender of the one or more senders and a particular recipient of the one or more recipients, the throttle settings is a configuration that limits messages that will be presented to the particular recipient from the particular sender, configuration of the throttle settings further acting to provide an automatic notification to the particular sender informing the particular sender that messages sent to the particular recipient have been delayed due to throttling; and
 a database operatively accessible by the server, the database being configured to store message management data for the users, the message management data including the throttle settings that are distinct for a plurality of the one or more senders that send messages to the particular recipient,
 wherein the particular recipient is provided with a user interface control for controlling invocation of at least one of the throttle settings on messages from the particular sender,
 wherein the messages that have been sent to the particular recipient that have been delayed due to throttling are chat or instant text messages,
 wherein the messages that have been sent to the particular recipient that have been delayed due to throttling are received, as text messages, by the particular recipient at a later time after the throttling, and
 wherein, when throttling is being performed, a visual indication is configured to be presented on a display of a computing device associated with the particular sender, the visual indication indicating those one or more messages from the particular sender that are being delayed from been presented to the particular recipient, and the visual indication being provided on or adjacent to the display of those one or more messages from the particular sender that are being delayed from being presented to the recipient.

2. The cloud system of claim 1, wherein at least one of the throttle setting pertains to a predefined threshold number of messages.

3. The cloud system of claim 1, further comprising:
 server-side logic for interfacing with client-side logic, the client-side logic being associated with an application that is downloadable from a network-based service to a user device, the application including user interfaces for composing messages, reading messages, sending messages and setting throttle settings.

4. The cloud system of claim 1, wherein a particular throttle setting of the throttle settings utilized is associated with the particular sender of a plurality of messages to the particular recipient, such that the plurality of messages from the sender to the recipient are handled in accordance with the particular throttle setting.

5. The cloud system of claim 1, further comprising:
 a data center for operating the server, and the data center providing access to the database.

6. The cloud system of claim 1, further comprising:
 an application programming interface (API) to a server of a social network, the social network identifying friends of a sender or recipient, the API providing a structured form for requesting data and receiving data from the social network.

7. A computer-implemented method for processing text messages exchanged between senders and recipients, the computer-implemented method is executed by one or more servers of a messaging service that is accessible to users that are users having user accounts with the messaging service, the computer-implemented method comprising:
- processing text messages by a user that acts as a sender to a user that acts as a recipient;
- receiving a throttle setting provided by the recipient, the throttle setting being a configuration that is applicable to the sender, the configuration identifying a threshold number of text messages that will be permitted to be sequentially received from the sender to the recipient before a throttle action is applied to the text messages received from the sender for the recipient, wherein the recipient is provided with a user interface control for setting at least one of the throttle settings applicable to messages from the sender;
- detecting that the threshold number of text messages sent from the sender to the recipient has been exceeded;
- delaying additional text messages sent by the sender to the recipient from being presented to the recipient after the threshold number of text messages has been detected to have been sent by the sender to the recipient; and
- presenting, as text messages, the additional text messages sent by the sender to the recipient at a later time after the delaying,
- providing a visual indication on a display of a computing device associated with the sender, the visual indication indicating those one or more text messages from the sender that have been delayed from been presented to the recipient, and the visual indication being provided on or adjacent those one or more text messages from the sender while such one or more text messages are being delayed from being presented to the recipient.

8. A computer-implemented method as recited in claim 7, wherein the computer-implemented method comprises:
- sending a notification to the sender informing the sender that the additional text messages to the recipient have been delayed due to exceeding the threshold number of text messages.

9. A computer-implemented method as recited in claim 8, wherein the computer-implemented method comprises:
- using a custom message for the notification.

10. A computer-implemented method as recited in claim 7, wherein the visual indication comprises a numeric indicator that indicates a number of those one or more messages from the sender that have been delayed from been presented to the recipient.

11. A computer-implemented method as recited in claim 7, wherein the users having user accounts with the messaging service are able to access the messaging service via an application accessible by user devices, the application including user interfaces for composing text messages, reading text messages, controls for sending text messages, controls for applying the throttle setting, controls for selecting recipients of text messages, and controls for viewing a history of messages between one or more senders and recipients.

12. A computer-implemented method as recited in claim 7, wherein the messaging service is configured to interact with a client-side application of the messaging service, the client-side application being a downloadable application that is provided by the messaging service, the client-side application includes a user interface for establishing the throttle setting.

13. A computer-implemented method as recited in claim 7, wherein a database stores message management information regarding at least throttle settings assigned to users acting as senders to particular recipients.

14. A computer-implemented method as recited in claim 13, wherein the receiving of the throttle setting provided by the recipient operates to receive the throttle setting provided by the recipient from the database.

* * * * *